US012751380B2

(12) United States Patent
Scully et al.

(10) Patent No.: US 12,751,380 B2
(45) Date of Patent: Oct. 6, 2026

(54) SYSTEMS AND METHODS FOR HARVESTING MYCELIA

(71) Applicant: Ecovative LLC, Green Island, NY (US)

(72) Inventors: Christopher Michael Scully, Troy, NY (US); Christopher William Werner, Old Chatham, NY (US); Ian Thomas Bonesteel, Wynantskill, NY (US); Maxwell Lee Carmack, Cochecton, NY (US); Asa Trench Snyder, Petersburg, NY (US)

(73) Assignee: Ecovative LLC, Green Island, NY (US)

( * ) Notice: Subject to any disclaimer, the term of this patent is extended or adjusted under 35 U.S.C. 154(b) by 646 days.

(21) Appl. No.: 18/296,706

(22) Filed: Apr. 6, 2023

(65) Prior Publication Data

US 2023/0320288 A1 Oct. 12, 2023

Related U.S. Application Data

(60) Provisional application No. 63/341,965, filed on May 13, 2022, provisional application No. 63/329,263, filed on Apr. 8, 2022.

(51) Int. Cl.
*A01G 18/70* (2018.01)
*A01G 18/80* (2018.01)

(52) U.S. Cl.
CPC ............. *A01G 18/70* (2018.02); *A01G 18/80* (2018.02)

(58) Field of Classification Search
CPC ................................ A01G 18/70; A01G 18/80
See application file for complete search history.

(56) References Cited

U.S. PATENT DOCUMENTS

| | | | |
|---|---|---|---|
| 1,979,176 | A | 10/1934 | Schicht |
| 2,450,055 | A | 9/1948 | Nord |
| 2,509,984 | A | 5/1950 | Morrow |
| 2,657,647 | A | 11/1953 | Rapisarda |
| 2,723,493 | A | 11/1955 | Stoller |
| 2,815,621 | A | 12/1957 | Carter |
| 2,964,070 | A | 12/1960 | Linhardt |
| 3,268,606 | A | 8/1966 | Jaeger |
| 3,316,592 | A | 5/1967 | Forrest |

(Continued)

FOREIGN PATENT DOCUMENTS

| | | | |
|---|---|---|---|
| CN | 1059662 | A | 3/1992 |
| CN | 1273249 | A | 11/2000 |

(Continued)

OTHER PUBLICATIONS

Abbadi et al., "Immunocytochemical identification and localization of lipase in cells of the mycelium of Penicillium cyclopium variety", Appl Microbial Biotechnol (1995) 42: 923-930.

(Continued)

*Primary Examiner* — Claude J Brown
(74) *Attorney, Agent, or Firm* — Dority & Manning, P.A.

(57) ABSTRACT

Apparatus and methods to harvest biopolymer material, such as a mycological material comprising mycelia. The mycelia products that are harvested can be used in the food industry (for example, as an animal-based meat-substitute) and in other industries, such as textiles, packaging, and others. The present invention provides mycelial harvesting methods and systems that are repeatable and energy efficient, while providing high quality and quantity mycelium-based products.

29 Claims, 16 Drawing Sheets

(56) References Cited

U.S. PATENT DOCUMENTS

| | | | |
|---|---|---|---|
| 3,317,375 | A | 5/1967 | Molinet et al. |
| 3,421,554 | A | 1/1969 | Carter |
| 3,477,558 | A | 11/1969 | Fleischauer |
| 3,499,261 | A | 3/1970 | Hullhorst et al. |
| 3,708,952 | A | 1/1973 | Schulze et al. |
| 3,717,953 | A | 2/1973 | Kuhn et al. |
| 3,782,033 | A | 1/1974 | Hickerson |
| 3,810,327 | A | 5/1974 | Giansante |
| 3,828,470 | A | 8/1974 | Stoller |
| 3,885,048 | A | 5/1975 | Liggett |
| 3,911,141 | A | 10/1975 | Farr et al. |
| 3,961,938 | A | 6/1976 | Iizuka et al. |
| 4,027,427 | A | 6/1977 | Stoller et al. |
| 4,036,122 | A | 7/1977 | Langen |
| 4,038,807 | A | 8/1977 | Beardsley et al. |
| 4,061,781 | A | 12/1977 | Solomons et al. |
| 4,063,383 | A | 12/1977 | Green |
| 4,073,956 | A | 2/1978 | Yates |
| 4,127,965 | A | 12/1978 | Mee |
| 4,136,767 | A | 1/1979 | Sarovich |
| 4,226,330 | A | 10/1980 | Butler |
| 4,233,266 | A | 11/1980 | Kummer |
| 4,263,744 | A | 4/1981 | Stoller |
| 4,265,915 | A | 5/1981 | MacLennan et al. |
| 4,294,929 | A | 10/1981 | Solomons et al. |
| 4,337,594 | A | 7/1982 | Hanacek et al. |
| 4,367,240 | A | 1/1983 | MacLennan et al. |
| 4,370,159 | A | 1/1983 | Holtz |
| 4,568,520 | A | 2/1986 | Ackermann et al. |
| 4,620,826 | A | 11/1986 | Rubio et al. |
| 4,716,712 | A | 1/1988 | Gill |
| 4,722,159 | A | 2/1988 | Watanabe et al. |
| 4,878,312 | A | 11/1989 | Shimizu |
| 4,922,650 | A | 5/1990 | Akao et al. |
| 4,960,413 | A | 10/1990 | Sagar et al. |
| 5,021,350 | A | 6/1991 | Jung et al. |
| 5,030,425 | A | 7/1991 | Bowers-Irons et al. |
| 5,074,959 | A | 12/1991 | Yamanaka et al. |
| 5,085,998 | A | 2/1992 | Lebron et al. |
| 5,088,860 | A | 2/1992 | Stockdale et al. |
| 5,123,203 | A | 6/1992 | Hiromoto |
| 5,230,430 | A | 7/1993 | Kidder |
| 5,306,550 | A | 4/1994 | Nishiyama et al. |
| 5,335,770 | A | 8/1994 | Baker et al. |
| 5,370,714 | A | 12/1994 | Ogawa |
| 5,433,061 | A | 7/1995 | Hutchinson et al. |
| 5,440,860 | A | 8/1995 | Meli et al. |
| 5,475,479 | A | 12/1995 | Hatakeyama et al. |
| 5,498,384 | A | 3/1996 | Volk et al. |
| 5,503,647 | A | 4/1996 | Dahlberg et al. |
| 5,511,358 | A | 4/1996 | Morita et al. |
| 5,532,217 | A | 7/1996 | Silver et al. |
| 5,569,426 | A | 10/1996 | Le Blanc |
| 5,589,390 | A | 12/1996 | Higuchi et al. |
| 5,590,489 | A | 1/1997 | Hattori et al. |
| 5,598,876 | A | 2/1997 | Zanini et al. |
| 5,606,836 | A | 3/1997 | Insalaco et al. |
| 5,647,180 | A | 7/1997 | Billings et al. |
| 5,681,738 | A | 10/1997 | Beelman et al. |
| 5,682,929 | A | 11/1997 | Maginot et al. |
| 5,685,124 | A | 11/1997 | Jandl |
| 5,711,353 | A | 1/1998 | Ichikawa et al. |
| 5,802,763 | A | 9/1998 | Milstein |
| 5,854,056 | A | 12/1998 | Dschida |
| 5,888,803 | A | 3/1999 | Starkey |
| 5,897,887 | A | 4/1999 | Haeberli |
| 5,919,507 | A | 7/1999 | Beelman et al. |
| 5,944,928 | A | 8/1999 | Seidner |
| 5,948,674 | A | 9/1999 | Mankiewicz |
| 5,979,109 | A | 11/1999 | Sartor et al. |
| 5,980,958 | A | 11/1999 | Naylor et al. |
| 6,041,544 | A | 3/2000 | Kananen et al. |
| 6,041,835 | A | 3/2000 | Price |
| 6,073,388 | A | 6/2000 | Kananen et al. |
| 6,098,677 | A | 8/2000 | Wegman et al. |
| 6,112,504 | A | 9/2000 | McGregor et al. |
| 6,143,549 | A | 11/2000 | Lamar et al. |
| 6,197,573 | B1 | 3/2001 | Suryanarayan et al. |
| 6,226,962 | B1 | 5/2001 | Eason et al. |
| 6,300,315 | B1 | 10/2001 | Liu |
| 6,306,921 | B1 | 10/2001 | Al Ghatta et al. |
| 6,329,185 | B1 | 12/2001 | Kofod et al. |
| 6,349,988 | B1 | 2/2002 | Foster et al. |
| 6,402,953 | B1 | 6/2002 | Gorovoj et al. |
| 6,425,714 | B1 | 7/2002 | Waddell |
| 6,444,437 | B1 | 9/2002 | Sporleder et al. |
| 6,471,993 | B1 | 10/2002 | Shastri et al. |
| 6,475,811 | B1 | 11/2002 | Babcock |
| 6,482,942 | B1 | 11/2002 | Vittori |
| 6,491,480 | B2 | 12/2002 | Waddell |
| 6,500,476 | B1 | 12/2002 | Martin et al. |
| 6,523,721 | B1 | 2/2003 | Nomoto et al. |
| 6,603,054 | B2 | 8/2003 | Chen et al. |
| 6,620,614 | B1 | 9/2003 | Lüth et al. |
| 6,660,164 | B1 | 12/2003 | Stover |
| 6,679,301 | B2 | 1/2004 | Makino et al. |
| 6,726,911 | B1 | 4/2004 | Jülich et al. |
| 6,737,065 | B2 | 5/2004 | Song et al. |
| 7,043,874 | B2 | 5/2006 | Wasser et al. |
| 7,073,306 | B1 | 7/2006 | Hagaman |
| 7,122,176 | B2 | 10/2006 | Stamets |
| 7,179,356 | B2 | 2/2007 | Aksay et al. |
| 7,395,643 | B2 | 7/2008 | Franchini et al. |
| 7,514,248 | B2 | 4/2009 | Gower et al. |
| 7,573,031 | B2 | 8/2009 | Behar et al. |
| 7,621,300 | B2 | 11/2009 | Bonney et al. |
| 7,661,248 | B2 | 2/2010 | Conti et al. |
| 7,754,653 | B2 | 7/2010 | Hintz |
| 7,836,921 | B2 | 11/2010 | Isomura et al. |
| 8,001,719 | B2 | 8/2011 | Bayer et al. |
| 8,067,237 | B2 | 11/2011 | Mooney et al. |
| 8,205,646 | B2 | 6/2012 | Isomura et al. |
| 8,227,224 | B2 | 7/2012 | Kalisz et al. |
| 8,227,233 | B2 | 7/2012 | Kalisz et al. |
| 8,241,415 | B2 | 8/2012 | Wantling et al. |
| 8,298,809 | B2 | 10/2012 | Kalisz et al. |
| 8,298,810 | B2 | 10/2012 | Rocco et al. |
| 8,313,939 | B2 | 11/2012 | Kalisz et al. |
| 8,517,064 | B2 | 8/2013 | Isomura et al. |
| 8,658,407 | B2 | 2/2014 | Lyons et al. |
| 8,763,653 | B2 | 7/2014 | Weigel et al. |
| 8,999,687 | B2 | 4/2015 | Bayer et al. |
| 9,066,657 | B2 | 6/2015 | Yazdanfar et al. |
| 9,068,171 | B2 | 6/2015 | Kelly et al. |
| 9,079,978 | B2 | 7/2015 | Räsänen et al. |
| 9,085,763 | B2 | 7/2015 | Winiski et al. |
| 9,253,889 | B2 | 2/2016 | Bayer et al. |
| 9,332,779 | B2 | 5/2016 | Marga |
| 9,394,512 | B2 | 7/2016 | Bayer et al. |
| 9,469,838 | B2 | 10/2016 | Schaak et al. |
| 9,485,917 | B2 | 11/2016 | Bayer et al. |
| 9,555,395 | B2 | 1/2017 | Araldi et al. |
| 9,714,180 | B2 | 7/2017 | McIntyre et al. |
| 9,752,122 | B2 | 9/2017 | Marga et al. |
| 9,795,088 | B2 | 10/2017 | Bayer et al. |
| 9,801,345 | B2 | 10/2017 | Bayer et al. |
| 9,803,171 | B2 | 10/2017 | Bayer et al. |
| 9,879,219 | B2 | 1/2018 | McIntyre et al. |
| 9,914,906 | B2 | 3/2018 | Winiski et al. |
| 10,125,347 | B2 | 11/2018 | Winiski |
| 10,144,149 | B2 | 12/2018 | McIntyre et al. |
| 10,154,627 | B2 | 12/2018 | McIntyre et al. |
| 10,172,301 | B2 | 1/2019 | McNamara et al. |
| 10,266,695 | B2 | 4/2019 | Lucht et al. |
| 10,407,675 | B2 | 9/2019 | Bayer et al. |
| 10,525,662 | B2 | 1/2020 | Bayer et al. |
| 10,533,155 | B2 | 1/2020 | Kozubal et al. |
| 10,537,070 | B2 | 1/2020 | Betts et al. |
| 10,575,579 | B2 | 3/2020 | Egeland et al. |
| 10,577,579 | B2 | 3/2020 | Kozubal et al. |
| 10,583,626 | B2 | 3/2020 | Bayer et al. |
| 10,589,489 | B2 | 3/2020 | Bayer et al. |
| 10,590,379 | B2 | 3/2020 | Kozubal et al. |
| 10,687,482 | B2 | 6/2020 | Ross et al. |

(56) References Cited

U.S. PATENT DOCUMENTS

| | | | |
|---|---|---|---|
| 10,785,925 | B2 | 9/2020 | McNamara et al. |
| 11,001,801 | B2 | 5/2021 | Kozubal et al. |
| 11,015,168 | B2 | 5/2021 | Kozubal et al. |
| 11,149,247 | B2 | 10/2021 | Harney et al. |
| 11,261,420 | B2 | 3/2022 | Kozubal et al. |
| 11,266,085 | B2 | 3/2022 | Kaplan-Bie et al. |
| 11,272,726 | B2 | 3/2022 | Macur et al. |
| 11,277,979 | B2 | 3/2022 | Greetham et al. |
| 11,277,981 | B2 | 3/2022 | Ross |
| 11,293,005 | B2 | 4/2022 | Carlton et al. |
| 11,297,866 | B2 | 4/2022 | Kozubal et al. |
| 11,343,979 | B2 | 5/2022 | Mueller et al. |
| 11,359,074 | B2 | 6/2022 | Kaplan-Bie et al. |
| 11,359,174 | B2 | 6/2022 | Winiski et al. |
| 11,407,973 | B2 | 8/2022 | Harney et al. |
| 11,420,366 | B2 | 8/2022 | McIntyre et al. |
| 11,432,575 | B2 | 9/2022 | Macur et al. |
| 11,459,541 | B2 | 10/2022 | Harney et al. |
| 11,464,251 | B2 | 10/2022 | Kozubal et al. |
| 11,466,245 | B2 | 10/2022 | Harney et al. |
| 11,478,007 | B2 | 10/2022 | Macur et al. |
| 11,505,779 | B2 | 11/2022 | Kozubal et al. |
| 11,666,080 | B2 | 6/2023 | Kozubal et al. |
| 2001/0012235 | A1 | 8/2001 | Schuchardt |
| 2002/0110427 | A1 | 8/2002 | Waddell |
| 2002/0131828 | A1 | 9/2002 | Waddell |
| 2002/0131933 | A1 | 9/2002 | Delmotte |
| 2003/0017565 | A1 | 1/2003 | Echigo et al. |
| 2003/0056451 | A1 | 3/2003 | Plsek et al. |
| 2003/0121201 | A1 | 7/2003 | Dahlberg et al. |
| 2003/0157219 | A1 | 8/2003 | Bijl et al. |
| 2003/0232895 | A1 | 12/2003 | Omidian et al. |
| 2004/0000090 | A1 | 1/2004 | Miller |
| 2004/0020553 | A1 | 2/2004 | Amano |
| 2004/0166576 | A1 | 8/2004 | Sadaie |
| 2004/0177585 | A1 | 9/2004 | Vermette |
| 2004/0211721 | A1 | 10/2004 | Stamets |
| 2005/0053778 | A1 | 3/2005 | Hukkanen |
| 2005/0133536 | A1 | 6/2005 | Kelsey et al. |
| 2005/0137272 | A1 | 6/2005 | Gaserod et al. |
| 2006/0121006 | A1 | 6/2006 | Chancellor et al. |
| 2006/0134265 | A1 | 6/2006 | Beukes |
| 2006/0280753 | A1 | 12/2006 | McNeary |
| 2007/0079944 | A1 | 4/2007 | Amidon et al. |
| 2007/0196509 | A1 | 8/2007 | Riman et al. |
| 2007/0225328 | A1 | 9/2007 | Fritz et al. |
| 2007/0227063 | A1 | 10/2007 | Dale et al. |
| 2007/0294939 | A1 | 12/2007 | Spear et al. |
| 2008/0017272 | A1 | 1/2008 | Isomura et al. |
| 2008/0046277 | A1 | 2/2008 | Stamets |
| 2008/0047966 | A1 | 2/2008 | Carson |
| 2008/0145577 | A1 | 6/2008 | Bayer et al. |
| 2008/0234210 | A1 | 9/2008 | Rijn et al. |
| 2008/0295399 | A1 | 12/2008 | Kawai et al. |
| 2008/0296295 | A1 | 12/2008 | Kords et al. |
| 2009/0107040 | A1 | 4/2009 | Vandnhove |
| 2009/0111163 | A1 | 4/2009 | Hoang et al. |
| 2009/0191289 | A1 | 7/2009 | Lutz et al. |
| 2009/0241623 | A1 | 10/2009 | Matano et al. |
| 2009/0246467 | A1 | 10/2009 | Delantar |
| 2009/0272758 | A1 | 11/2009 | Karwacki et al. |
| 2009/0307969 | A1 | 12/2009 | Bayer et al. |
| 2009/0321975 | A1 | 12/2009 | Schlummer |
| 2010/0101190 | A1 | 4/2010 | Dillon |
| 2010/0158976 | A1 | 6/2010 | O'Brien et al. |
| 2010/0159509 | A1 | 6/2010 | Xu et al. |
| 2010/0199601 | A1 | 8/2010 | Boldrini et al. |
| 2010/0227931 | A1 | 9/2010 | Kuwano et al. |
| 2010/0243135 | A1 | 9/2010 | Pepper et al. |
| 2010/0326564 | A1 | 12/2010 | Isomura et al. |
| 2011/0094154 | A1 | 4/2011 | Joaquin |
| 2011/0108158 | A1 | 5/2011 | Huwiler et al. |
| 2011/0265688 | A1 | 11/2011 | Kalisz et al. |
| 2011/0268980 | A1 | 11/2011 | Kalisz et al. |
| 2011/0269209 | A1 | 11/2011 | Rocco et al. |
| 2011/0269214 | A1 | 11/2011 | Kalisz et al. |
| 2011/0306107 | A1 | 12/2011 | Kalisz et al. |
| 2012/0000165 | A1 | 1/2012 | Williams |
| 2012/0006446 | A1 | 1/2012 | Isomura et al. |
| 2012/0060446 | A1 | 3/2012 | Merz |
| 2012/0076895 | A1 | 3/2012 | Kirejevas et al. |
| 2012/0115199 | A1 | 5/2012 | Li et al. |
| 2012/0124839 | A1 | 5/2012 | Kalisz et al. |
| 2012/0132314 | A1 | 5/2012 | Weigel et al. |
| 2012/0135504 | A1 | 5/2012 | Ross |
| 2012/0225471 | A1 | 9/2012 | McIntyre et al. |
| 2012/0227899 | A1 | 9/2012 | McIntyre et al. |
| 2012/0231140 | A1 | 9/2012 | Hofmann et al. |
| 2012/0270031 | A1 | 10/2012 | Guan et al. |
| 2012/0270302 | A1 | 10/2012 | Bayer et al. |
| 2012/0315687 | A1 | 12/2012 | Bayer et al. |
| 2013/0095560 | A1 | 4/2013 | McIntyre et al. |
| 2013/0105036 | A1 | 5/2013 | Smith et al. |
| 2013/0210327 | A1 | 8/2013 | Corominas |
| 2013/0224840 | A1 | 8/2013 | Bayer et al. |
| 2013/0274892 | A1 | 10/2013 | Lelkes et al. |
| 2013/0309755 | A1 | 11/2013 | McIntyre et al. |
| 2014/0038619 | A1 | 2/2014 | Moulsley |
| 2014/0056653 | A1 | 2/2014 | Scully et al. |
| 2014/0069004 | A1 | 3/2014 | Bayer et al. |
| 2014/0093618 | A1 | 4/2014 | Forgacs et al. |
| 2014/0120602 | A1 | 5/2014 | Winiski et al. |
| 2014/0163142 | A1 | 6/2014 | Zhang et al. |
| 2014/0173977 | A1 | 6/2014 | Juscius |
| 2014/0186927 | A1 | 7/2014 | Winiski et al. |
| 2014/0371352 | A1 | 12/2014 | Dantin et al. |
| 2015/0033620 | A1 | 2/2015 | Greetham et al. |
| 2015/0038619 | A1 | 2/2015 | McIntyre et al. |
| 2015/0101509 | A1 | 4/2015 | McIntyre et al. |
| 2015/0197358 | A1 | 7/2015 | Larsen |
| 2015/0342138 | A1 | 12/2015 | Bayer et al. |
| 2015/0342224 | A1 | 12/2015 | Medoff |
| 2016/0002589 | A1 | 1/2016 | Winiski |
| 2016/0073589 | A1 | 3/2016 | McNamara et al. |
| 2016/0264926 | A1 | 9/2016 | Winiski et al. |
| 2016/0355779 | A1 | 12/2016 | Ross |
| 2017/0000040 | A1 | 1/2017 | Bayer et al. |
| 2017/0071214 | A1 | 3/2017 | Rehage |
| 2017/0218327 | A1 | 8/2017 | Amstislavski et al. |
| 2017/0253849 | A1 | 9/2017 | Miller et al. |
| 2017/0253852 | A1 | 9/2017 | Bayer et al. |
| 2018/0014468 | A1 | 1/2018 | Ross et al. |
| 2018/0148682 | A1 | 5/2018 | Ross et al. |
| 2018/0368337 | A1 | 12/2018 | McIntyre et al. |
| 2019/0059431 | A1 | 2/2019 | Kozubal et al. |
| 2019/0090436 | A1 | 3/2019 | Betts et al. |
| 2019/0284307 | A1 | 9/2019 | Chase et al. |
| 2019/0322997 | A1 | 10/2019 | Schaak |
| 2019/0330668 | A1 | 10/2019 | Kozubal et al. |
| 2019/0338240 | A1 | 11/2019 | Carlton et al. |
| 2019/0359931 | A1 | 11/2019 | Mueller et al. |
| 2019/0390156 | A1 | 12/2019 | Bayer et al. |
| 2020/0024577 | A1 | 1/2020 | Carlton et al. |
| 2020/0025672 | A1 | 1/2020 | Scullin et al. |
| 2020/0055274 | A1 | 2/2020 | Bayer et al. |
| 2020/0095535 | A1 | 3/2020 | Kozubal et al. |
| 2020/0157506 | A1 | 5/2020 | Bayer et al. |
| 2020/0196541 | A1 | 6/2020 | Ross et al. |
| 2020/0208097 | A1 | 7/2020 | Winiski |
| 2020/0239830 | A1 | 7/2020 | O'Brien et al. |
| 2020/0255794 | A1 | 8/2020 | Amstislavski et al. |
| 2020/0268031 | A1 | 8/2020 | Macur et al. |
| 2020/0270559 | A1 | 8/2020 | Macur et al. |
| 2020/0392341 | A1 | 12/2020 | Smith et al. |
| 2021/0017486 | A1 | 1/2021 | Kozubal et al. |
| 2021/0317433 | A9 | 10/2021 | Schaak |
| 2021/0348117 | A9 | 11/2021 | Winiski |
| 2021/0401019 | A1 | 12/2021 | Bayer et al. |
| 2022/0025318 | A1 | 1/2022 | Gandia et al. |
| 2022/0142907 | A1 | 5/2022 | Bayer et al. |
| 2022/0240557 | A1 | 8/2022 | Kawabata et al. |
| 2022/0290199 | A1 | 9/2022 | Greetham et al. |
| 2022/0295825 | A1 | 9/2022 | Ghotra et al. |
| 2022/0298470 | A1 | 9/2022 | Sayed et al. |

(56) References Cited

U.S. PATENT DOCUMENTS

2022/0315881 A1 10/2022 Macur
2022/0333055 A1 10/2022 Winiski et al.
2022/0338420 A1 10/2022 Jönsson
2022/0338421 A1 10/2022 Call et al.
2022/0354068 A1 11/2022 Carlton et al.
2022/0354152 A1 11/2022 Winiski et al.
2022/0361424 A1 11/2022 Mueller et al.
2022/0386666 A1 12/2022 Kawabata et al.
2022/0396052 A9 12/2022 Bayer et al.
2023/0013465 A1 1/2023 Kaplan-Bie et al.
2023/0016412 A1 1/2023 Perry
2023/0024708 A1 1/2023 Kaplan-Bie et al.
2023/0056666 A1 2/2023 Winiski et al.
2023/0219265 A1 7/2023 McIntyre et al.
2023/0320288 A1 10/2023 Scully et al.

FOREIGN PATENT DOCUMENTS

CN 1358413 A 7/2002
CN 1732887 A 2/2006
CN 101248869 A 8/2008
CN 101653081 A 2/2010
CN 101743854 B 2/2013
CN 103146585 A 6/2013
CN 101892163 B 7/2013
CN 103283482 B 7/2014
CN 103396954 B 11/2014
CN 104381019 A 3/2015
CN 104025909 B 5/2016
CN 105961035 A 9/2016
CN 106380166 A 2/2017
CN 106635825 A 5/2017
CN 106947702 A 7/2017
CN 108249037 A 7/2018
CN 108753624 A 11/2018
CN 108934760 A 12/2018
CN 208191626 U 12/2018
CN 109897394 A 6/2019
CN 106613359 B 1/2020
CN 111066577 A 4/2020
CN 210352453 U 4/2020
CN 112225326 A 1/2021
CN 112442449 A 3/2021
CN 113501994 A 10/2021
CN 108753625 B 11/2021
CN 113692913 A 11/2021
CN 114175968 A 3/2022
CN 216106969 U 3/2022
CN 114617025 A 6/2022
CN 111990171 B 7/2022
CN 115104479 A 9/2022
CN 115181679 A 10/2022
EP 0226292 A1 6/1987
EP 1312547 A1 5/2003
EP 2677030 A1 12/2013
EP 2735318 A1 5/2014
EP 2835058 A1 2/2015
EP 2875805 A1 5/2015
EP 2878340 A1 6/2015
EP 2485779 B1 2/2018
EP 3292769 A1 3/2018
ES 2497415 B1 4/2015
FR 3006693 A1 12/2014
FR 3071507 A1 3/2019
GB 142800 A 1/1921
GB 1525484 A 9/1978
GB 2032456 A 5/1980
GB 2165865 A 4/1986
IN 358266 B 7/2020
IN 202111003691 A 2/2021
IN 202141024595 A 7/2021
IN 202031032279 A 2/2022
JP S52066679 A 6/1977
JP S55048388 A 4/1980
JP H03234889 A 10/1991
JP H049316 A 1/1992
JP 2002104988 A 4/2002
JP 2003526353 A 9/2003
JP 2009519042 A 5/2009
JP 2011130766 A 7/2011
JP 2016512699 A 5/2016
JP 6111510 B1 4/2017
JP 2023002897 A 1/2023
KR 20050001175 A 1/2005
KR 101569282 B1 11/2015
KR 101619664 B1 5/2016
KR 101851655 B1 4/2018
KR 102256335 B1 5/2021
KR 20220138955 A 10/2022
KR 102463058 B1 11/2022
KR 20220163083 A 12/2022
KR 20220163084 A 12/2022
MX 2017016725 A 6/2019
MY 163845 A 10/2017
RU 2716106 C1 3/2020
TH 17298 U 2/2021
WO WO 1992/013960 8/1992
WO WO 1998/052403 A1 11/1998
WO WO 1999/024555 5/1999
WO WO 2001/087045 11/2001
WO WO 2002/019798 3/2002
WO WO 2003/089506 10/2003
WO WO 2004/111181 12/2004
WO WO 2005/023323 3/2005
WO WO 2005/067977 7/2005
WO WO 2007/031129 3/2007
WO WO 2007/139321 12/2007
WO WO 2008/025122 3/2008
WO WO 2008/073489 6/2008
WO WO 2010/005476 1/2010
WO WO 2012/122092 9/2012
WO WO 2012/148995 11/2012
WO WO 2014/039938 3/2014
WO WO 2014/110539 7/2014
WO WO 2014/195641 12/2014
WO WO 2015/024751 2/2015
WO WO 2016/149002 9/2016
WO WO 2017/056059 4/2017
WO WO 2017/120342 7/2017
WO WO 2017/125602 A1 7/2017
WO WO 2017/132523 8/2017
WO WO 2017/136950 8/2017
WO WO 2017/151684 9/2017
WO WO 2017/205750 11/2017
WO WO 2018/011805 1/2018
WO WO 2018/014004 1/2018
WO WO 2018/064968 4/2018
WO WO 2018/183735 10/2018
WO WO 2018/189738 10/2018
WO WO 2019/046480 3/2019
WO WO 2019/099474 A1 5/2019
WO WO 2019/178406 9/2019
WO WO 2019/217175 11/2019
WO WO 2019/226823 11/2019
WO WO 2019/237059 12/2019
WO WO 2019/246636 12/2019
WO WO 2020/023450 1/2020
WO WO 2020/072140 4/2020
WO WO 2020/082043 4/2020
WO WO 2020/082044 4/2020
WO WO 2020/102552 5/2020
WO WO 2020/106743 5/2020
WO WO 2020/176758 9/2020
WO WO 2020/186068 9/2020
WO WO 2020/186169 9/2020
WO WO 2020/237201 11/2020
WO WO 2021/092051 A1 5/2021
WO WO 2021/144603 7/2021
WO WO 2022/079452 4/2022
WO WO 2022/091089 5/2022
WO WO 2022/135757 6/2022
WO WO 2022/157326 7/2022
WO WO 2022/189600 9/2022
WO WO 2022/195617 9/2022

(56) References Cited

FOREIGN PATENT DOCUMENTS

| | | |
|---|---|---|
| WO | WO 2022/200049 | 9/2022 |
| WO | WO 2022/212945 | 10/2022 |
| WO | WO 2022/265498 | 12/2022 |

OTHER PUBLICATIONS

Agnese et al., "Investigating the Influence of Various Plasticizers on the Properties of Isolated Films of Polyvinyl Acetat". The 37th Annual meeting and Exposition of the Controlled Release Society, Jul. 2010, Portland, OR U.S.A.
Ahlawat et al., "Management of Spent Mushroom Substrate". Indian Council of Agricultural Res., Jan. 1, 2007; 55 pages.
Amsellem et al., "Long-term preservation of viable mycelia of two mycoherbicidal organisms". Crop Protection (1999) 18: 643-649.
Ando et al., "Cosmetic material for skin whitening—contains mushroom mycelium cultured matter and e.g. ginseng extract, chondroitin sodium sulphate and/or hyaluronic acid", WPI/Thomson (Jan. 14, 1992), 1992(8): Accession #1992-062018; Abstract of JP4009316A; in 9 pages.
Angelini et al., "Effect of antimicrobial activity of Melaleuca alternifolia essential oil on antagonistic potential of *Pleurotus* species against Trichoderma harzianum in dual culture." World J Microbiol Biotech. (2008) 24(2): 197-202.
Antinori et al., "Advanced mycelium materials as potential self-growing biomedical scaffolds." Scientific reports (Jun. 2021) 11(1): 1-14.
Antón et al., "PimM, a PAS Domain Positive Regulator of Pimaricin Biosynthesis in Streptomyces natalensis." Microbiol. (2007) 153: 3174-3183.
Appels et al., "Hydrophobin gene deletion and environmental growth conditions impact mechanical properties of mycelium by affecting the density of the material." Scientific Reports (2018) 8(1): 1-7.
Arshad et al., "Tissue engineering approaches to develop cultured meat from cells: a mini review." Cogent Food & Agriculture (2017) 3(1): 1320814 in 11 pages.
Ashiuchi et al., "Isolation of Bacillus subtilis (chungkookjang), a poly-gamma-glutamate producer with high genetic competence". Appl Microbiol Biotechnol. (2011) 57: 764-769.
ASTM International, "Standard Test Method for Tensile Properties of Plastics". Designation: D638-10, published Jun. 2010 in 16 pages.
Attias et al., "Biofabrication of Nanocellulose-Mycelium Hybrid Materials", Adv Sustainable Syst. (2020) 5(2): 2000196 in 12 pages; Supporting Information in 7 pages.
Bajaj et al., "Poly (glutamic acid)—An emerging biopolymer of commercial interest". Bioresource Tech. (2011) 102(10): 5551-5561.
Bandalan et al., "Inhibitory effect of garlic (*Allium sativum* L.) against bread mold and its influence on the quality of yeast-leavened bread", Int J Food Engineer. (Dec. 2018) 4(4): 256-262.
Bartnicki-Garcia, "Cell wall chemistry, morphogenesis, and taxonomy of fungi", Annual Review Microbiol. (1968) 22(1): 87-108.
Baysal et al., "Cultivation of oyster mushroom on waste paper with some added supplementary materials". Biosource Technology (2003) 89: 95-97.
Begum et al., "Bioconversion and saccharification of some lignocellulosic wastes by Aspergillus oryzae ITCC-4857.01 for fermentable sugar production". Elect J Biotech. (2011) (14)5: 3 in 8 pages.
Belardinelli et al., "Actions of Adenosine and Isoproterenol on Isolated Mammalian Ventricular Myocytes." Circulation Res. (1983) 53(3): 287-297.
Belay et al., "Preparation and Characterization of Graphene-agar and Graphene Oxide-agar Composites." JOAPS (2017) 134(33): 45085.
Bianchi et al., "Comparison between Allo-Kramer and Warner Bratzler Devices to Assess Rabbit Meat Tenderness", Italian J Animal Science (2007) 6(suppl): 749-751.
Binder et al., "Phylogenetic and phylogenomic overview of the Polyporales". Mycologia (Nov. 12, 2013) 105(6): 1350-1373.
Blanchette et al., "Fungal mycelial mats used as textile by indigenous people of North America", Mycologia (Feb. 20, 2021) pp. 1-7.
Booth et al., "Potential of a dried mycelium formulation of an indigenous strain of Metarhizium anisopliae against subterranean pests of cranberry." Biocontrol Science and Technology (2000) 10: 659-668.
Bormann et al., "Characterization of a Novel, Antifungal, Chitin-binding Protein from *Streptomyces tendae* Tü901 that Interferes with Growth Polarity." J Bacter. (1999) 181(24): 7421-7429.
Borrás et al., "Trametes versicolor pellets production: Low-cost medium and scale-up", Biochem Eng J. (2008) 42(1): 61-66.
Boudaoud et al., "FibrilTool, an ImageJ plug-in to quantify fibrillar structures in rax microscopy images", Nature Protocols (2014) 9: 457-483.
Bowman et al., "The structure and synthesis of the fungal cell wall". Bioassays (2006) 28(8): 799-808.
Britannica, The Editors of Encyclopedia. "mold". Encyclopedia Britannica, Feb. 7, 2021, https://www.britannica.com/science/mold-fungus. 1 page.
Bružauskaite et al., "Scaffolds and Cells for Tissue Regernation: Different Scaffold Pore Sizes—Different Cell Effects." Cytotechnology (2016) 68(3): 355-369.
Byrd, "Clean meat's path to your dinner plate", The Good Food Institute, website accessed Nov. 14, 2018, https://www.gfi.org/clean-meats-path-to-commercialization; 11 pages.
Cerimi et al., "Fungi as source for new bio-based materials: a patent review", Fungal Biol Biotechnol. (2019) 6: 17; 10 pgs.
Cha et al., "Biomimetic synthesis of ordered silica structures mediated by block copolypeptides". Nature (2000) 403(6767): 289-292.
Chai et al., "β-Glucan Synthase Gene Overexpression and β-Glucans Overproduction in Pleurotus ostreatus Using Promoter Swapping". PLoS ONE (2013) 8(4): e61693 in 7 pages.
Chaudhary et al., "Understanding rice hull ash as fillers in polymers: a review". Silicon Chemistry (2002) 1:281-289.
Chi et al., "Can Co-culturing of Two White-rot Fungi Increase Lignin Degradation and the Production of Lignin-degrading Enzymes?" Inter'l Biodeter Biodegrad. (2007) 59(1): 32-39.
Collins English Dictionary, "Mould", retrieved from http://collinsdictionary.com/dictionary/english/mould, archived on Apr. 8, 2015, 3 pages.
Collins English Dictionary, "Cavity", Definition; retrieved on Nov. 8, 2021; 1 page.
Dias et al., "Synthesis and characterization of chitosan-polyvinyl alcohol-bioactive glass hybrid membranes". Biomatter (2011) 1(1): 114-119.
Dugdale J. "This new surf company is making boards of mushrooms". Blog post—Jun. 25, 2015.
Economou et al., Valorization of Spent Oyster Mushroom Substrate and Laccase Recovery ThroughSuccessive Solid State Cultivation of Pleurotus, Ganoderma, and Lentinula Strains. Appl Microbiol Biotech. Jun. 2017;101(12): 5213-5222.
Elleuche et. al., "Carbonic anhydrases in fungi". Microbiology (2010) 156: 23-29.
Elsacker et al., "Mechanical, physical and chemical characterisation of mycelium-based composites with different types of lignocellulosic substrates". PLoS One. Jul. 22, 2019;14(7): e0213954 in 20 pages.
Elsacker et al., "Growing living and multifunctional mycelium composites for large-scale formwork applications using robotic abrasive wire-cutting", Construction Bldg Mater. (2021) 283: 122732 in 16 pages.
Elsoud et al., "Current trends in fungal biosynthesis of chitin and chitosan". Bull Nat'l Res Centre. Dec. 2019;43(1): 12 pages.
Enrione et al., "Edible scaffolds based on non-mammalian biopolymers for Myoblast growth". Materials (Basel) (Dec. 2017) 10(12): 1404 in 15 pages.
Fisher A., "Industrial-strength fungus—Densely packed rootlike fibers can do the job of Styrofoam, insulation and, yes, even bricks". TIME Feb. 8, 2010:1 page.

(56) References Cited

OTHER PUBLICATIONS

Fleet G.H., "Cell walls". in The Yeasts, by Rose et al. [Eds.] 2nd Edition. vol. 4. London: Academic Press. (1991) pp. 199-277.
Frandsen R.J.N., "A guide to binary vectors and strategies for targeted genome modification in fungi using Agrobacterium tumefaciens-mediated transformation". J Microbiol Methods (2011) 87: 247-262.
Gardening KnowHow, Perlite Soil Info: Learn About Perlite Potting Soil, online at www.gardeningknowhow.com/garden-how-to/soil-fertilizers/perlite-potting-soil.htm downloaded on Dec. 16, 2015., 3 pages.
Glowacki et al., "Bioconjugation of Hydrogen-bonded Organic Semiconductors with Functional Proteins." J Mate Chem. C (2015) 3(25): 6554-6564.
Goodell et al., "Fungal Decay of Wood: Soft Rot-Brown Rot-white Rot". In Development of Commercial Wood Preservatives; Schultz et al. [Ed.] ACS Symposium Series; American Chemical Society, Washington, D.C. (2008), Chapter 2, pp. 9-31.
Google Report, Complete colonization substrate mushroom (2 pages) Jan. 30, 2018., 2 pages.
Google Dictionary Definition "Composite", downloaded on Nov. 21, 2018; 1 page.
Gourmet Mushroom, Inc., "What is Mushroom?"—Mushroom Facts Mushroom Information—Educational & Science Projects (2004). Downloaded from www.gmushrooms.com, on Nov. 27, 2017; 5 pages.
Grant, James. J.—"An investigation of the airflow in mushroom growing structures, the development of an improved, three-dimensional solution technique for fluid flow and its evaluation for the modelling of mushroom growing structures", Doctoral Thesis Sep. 2002; 326 pages.
Green et al., "Mechanical Properties of Wood", Forest Products Laboratory, 1999. in Wood Handbook—Wood as an engineering material. Gen Tech. Rep. FPL-GTR-113, Chapter 4 in 46 pages.
Greetham et al., "Pheotypic characterisation of *Saccharomyces sensu* stricto to Inhibitory Compounds Released During the Deconstruction of Lignocellulosic Material." 3rd International Congress on Yeasts, ICY Aug. 26-30, 2012, Madison, USA; 1 page.
Griffin et al., "Regulation of macromolecular synthesis, colony development and specific growth rate of Achlya bisexualis during balanced growth". J General Microbiol. (1974) 80(2): 381-388.
Growers Supply. "Horticultural Coarse Perlite—4 Cubic Fee—Growers Supply". URL: https://growerssupply.com; Growers Supply 2012; www.growerssupply.com/farm/supplies/prod1:gs_growing_mediums:pg111049.html; downloaded Dec. 14, 2020 in 3 pages.
Guan et al., "Construction and development of an auto-regulatory gene expression system in Bacillus subtilis". Microb Cell Fact Dec. 2015;14(1): 1-5.
Halseide P., "Cutting brick the safe way". The Aberdeen Group (1988) Publication #M880354 in 2 pages.
Haneef et al., "Advanced Materials from Fungal Mycelium: Fabrication and Tuning of Physical Properties", Scient Reports. Jan. 24, 2017;7(1): 1-11.
Hartl et al., "Fungal chitinases: diversity, mechanistic properties and biotechnological potential". Appl Microbiol Biotechnol. Jan. 2012;93: 533-543.
Heinzkill et al., "Characterization of laccases and peroxidases from wood-rotting fungi (family Coprinaceae)." Appl Environ Microbiol. (1998) 64: 1601-1606.
Heisig et al., USGS, "Ground-Water Resources of the Clifton Park Area, Saratoga County, New York", 2002, retrieved from the internet (Oct. 15, 2016): http://ny.water.usgs.gov/pubs/wri/wri014104/wrir01-4104.pdf; 27 pages.
Hidayat et al., "Characterization of polylactic acid (PLA)/kenaf composite degradation by immobilized mycelia of Pleurotus ostreatus". Inter Biodeter Biodegrad. (2012) 71: 50-54.
Highland Woodworking, "Making Thin Lumber and Veneer Out of Ordinary Boards", Sales Website (2017) in 3 pages.
Holt et al., "Biobased Composition Boards Made from Cotton Gin and Guayule Wastes: Select Physical and Mechanical Properties", Int J Mater Prod Tech. (2009) 36: 104-114.
Holt et al. "Fungal mycelium and cotton plant materials in the manufacture of biodegradable molded packaging material: Evaluation study of select blends of cotton byproducts." J Biobased Mater Bioenergy (2012) 6(4): 431-439.
Home Depot "Miracle Gro® Perlite Mix", retrieved from the internet: http://homedepot.com/p/Miracle-Gro-8-pt-Perlite-Mix-74278430/204502291 on Feb. 6, 2016; 2 pages.
Home Depot "Pennington—Fast Acting Gypsum", retrieved from the internet: http://homedepot.com/p/Pennington-30-lb-Fast-Acting-Gypsum-Plus-AST-Dry-Lawn-Fertilizer-423008/202496234 on Feb. 6, 2016; 2 pages.
Horton et al., "Regulation of Dikaryon-Expressed Genes by FRT1 in the Basidiomycete Schizophyllum commune". Fungal Genet Biol. (1999) 26(1): 33-47.
Howden et al., "The effects of breathing 5% CO2 on human cardiovascular responses and tolerance to orthostatic stress". Exper. Physiol. (2004) 89(4): 465-471.
Huang et al., "Genetically engineering Bacillus subtilis with a heat-resistant arsenite methyltransferase for bioremediation of arsenic-contaminated organic waste". Appl Enviro Microbiol. Oct. 1, 2015;81(19): 6718-6724.
Hüttner et al., "Recent advances in the intellectual property landscape of filamentous fungi", Fungal Biol Biotechnol. (2020) 7:16; 17 pgs.
Hyde et al., "The amazing potential of fungi: 50 ways we can exploit fungi industrially". Fungal Diversity (2019) 97(1): 1-136.
IFC Solutions. Natural Food Coloring. 2023; pp. 1-4.
Instructables, How to Grow Oyster Mushroom Spawn (Low Tech), retrieved from the internet Aug. 19, 2018: http://www.instructables.com/id/1-How-to-Grow-Oyster-Mushroom-Spawn-Low-Tech/; 17 pages.
Islam et al., "Morphology and mechanics of fungal mycelium", Scientific Reports, (2017) 7(1): 1-12.
Jiang et al., "Manufacturing of Natural Composites with a Mycelium Binder and Vacuum-infused Vegetable Oil-based Resins", Poster dated May 2014; 1 page.
Jiang et al., "Vacuum Infusion of Mycelium-Bound Biocomposite Preforms with Natural Resins", CAMX ExpoConference Proceedings, Oct. 13-16, 2014, 13 pages.
Jiang et al., "Bioresin Infused then Cured Mycelium-based Sandwich-structure Biocomposites: Resin Transfer Molding (RTM) Process, Flexural Properties, and Simulation." J Cleaner Production (2019) 207: 123-135.
Jones et al., "Mycelium Composites: A Review of Engineering Characteristics and Growth Kinetics", J Bionanoscience (2017) 11(4): 241-257.
Jones et al., "Waste-derived Low-cost Mycelium Composite Construction Materials with Improved Fire Safety", FAM (Fire and Materials) (2018) 42(7): 816-825.
Jones et al., Chitin-chitosan Thin Films from Microbiologically Upcycled Agricultural By-products. In 13th International Conference on the Mechanical Behavious of Materials, Melbourne, Australia (Jun. 2019) p. 66; in 7 pages.
Jones et al., "Leather-like material biofabrication using fungi", Nature Sustainability (2020) https://doi.org/10.1038/s41893-020-00606-1, Sep. 7, 2020.
Kamzolkina et al., "Micromorphological features of Pleurotus pulmonarius (Fr.) Quel. and P. ostreaturs (Jacq.) P. Kumm. Strains in pure and binary culture with yeasts". Tsitologiia (2006) 48(2): 153-160.
Kadirgamar S., "Company Uses Mushrooms to Grow Plastic Alternatives". Oct. 17, 2017; downloaded from https://daily.jstor.org/daily-author/skanda-kadirgamar/ in 5 pages.
Kemppainen et al., "Transformation of the Mycorrhizal Fungus Laccaria Bicolor using Agrobacterium tumefaciens." Bioengin Bugs (2011) 2(1): 38-44.
Kerem et al., "Effect of Mananese on Lignin Degradation by Pleurotus ostreatus during Solid-State Fermentation". Applied and Environmental Microbiology (1993) 59(12): 4115-4120.

(56) References Cited

OTHER PUBLICATIONS

Kerem et al., "Chemically defined solid-state fermentation of Pleurotus Ostreatus". Enzyme Microbiol Tech. (1993) 15(9): 785-790.
Kilaru et al., "Investigating dominant selection markers for Coprinopsis cinerea: a carboxin resistance system and re-evaluation of hygromycin and phleomycin resistance vectors". Curr Genet. (2009) 55: 543-550.
Kim et al., "Effect of aeration and agitation on the production of mycelial biomass and exopolysaccharides in an enthomopahtogenic fungus *Paecilomyces sinclairlii*". Ltts Applied Microbiol. May 1, 2003;36(5): 321-326.
Kim et al., "Current Technologies and Related Issues for Mushroom Transformation." Mycobiology (2015) 43(1): 1-8.
Kokubo et al., "Ca,P-rich layer formed on high-strength bioactive glass-ceramic A-W". J Biomed Mater Res. (1990) 24(3): 331-343.
Kotlarewski et al., "Mechanical Properties of Papua New Guinea Balsa Wood." European J Wood Wood Products (2016) 74(1): 83-89.
Koutsoukos et al., "Precipitation of calcium carbonate in aqueous solutions". J Chem Soc., Faraday Trans. 1, Physical Chemistry in Condensed Phases, (1984) 80(5): 1181-1192.
Kück et al., "New tools for the genetic manipulation of filamentous fungi". Appl Microbiol Biotechnol. (2010) 86: 51-62.
Kües, U., "Life History and Development Processes in the Basidiomycete Coprinus Cinereus." Micro Molecular Biol Rev. (2000) 64(2): 316-353.
Kuhar et al., by Ingredi Potassium Sorbate vs Campden Tablets in Wine Making; Jun. 4, 2018. [online]; Retrieved from the Internet <URL: https://ingredi.com/blog/potassium-sorbate-vs-campden-tables-in-wine-making/>; 2 pages.
Kuhn et al., [Eds.] Cell Walls and Membranes in Fungi—An Introduction (Abstract) in Biochemistry of Cell Walls and Membranes in Fungi, Chapter 1, Springer Verlag Berlin/Heidelberg 1990, 2 pages.
Kumar, M.N.V.R., "A review of chitin and chitosan applications". React Function Polymers. Nov. 1, 2000;46(1):1-27.
Kumla et al., "Cultivation of Mushrooms and Their Lignocellulolytic Enzyme Production Through the Utilization of Agro-Industrial Waste". Molecules Jun. 2020;25(12): 2811 in 41 pages.
Kuo, 2005-2006. Glossary of Mycological Terms. Mushroom Expert. Com., pp. 1-13; downloaded from http://www.mushroomexpert.com/glossary.html (May 8, 2015).
Li et al., "Preparation and Characterization of Homogeneous Hydroxyapatite/Chitosan Composite Scaffolds via In-Situ Hydration". J Biomaterials Nanobiotech. (2010) 1: 42-49.
Lu et al., "Theoretical Analysis of Calcium Phosphate precipitation in simulated Body Fluid". Biomaterials (2005) 26(10): 1097-1108—Pre-Pub. Version by Hong Kong University of Science and Technology, Department of Mechanical Engineering, Kowloon; 34 pages.
Lumb et al., "Metal Chelating Tendencies of Glutamic and Aspartic Acids". J Phys Chem., Jul. 1953;57(7): 690-693.
Luo et al., "*Coprinus comatus*: a basidiomycete fungus forms novel spiny structures and infects nematode." Mycologia (2004) 96(6): 1218-1225.
Magyar C., "11 Smart uses for sawdust around your home & garden". Rural Sprout, published Oct. 26, 2020, 19 pages.
Manoli et al., "Crystallization of calcite on chitin". J Cryst Growth, (1997) 182(1-2): 116-124.
Matute et al., Agaricus blazei Production on Non-composted Substrates Based on Sunflower Seed Hulls and Spent Oyster Mushroom Substrate. World J Microbiol Biotech. Jun. 2011;27(6): 1331-1339.
McPherson et al., "Dissolvable Antibiotic Beads in Treatment of Periprosthetic Joint Infection and Revision Arthroplasty: The Use of Synthetic Pure Calcium Sulfate (Stimulan®) Impregnated with Vancomycin & Tobramycin." Reconstructive Review (2013) 3(1) 12 pages.
Merriam-Webster, "Chamber" dictionary definition; https://www.merriam-webster.com/dictionary accessed Jul. 10, 2017; in 4 Pages.
Merriam-Webster, "pack" Thesaurus definition; https://www.merriam-webster.com/thesaurus; synonyms accessed Aug. 19, 2019; in 10 Pages.
Merriam-Webster, "desiccated" (Adj.) Definition; downloaded on Nov. 8, 2021; 1 page.
Meyer et al., "Comparison of the Technical Performance of Leather, Artificial Leather, and Trendy Alternatives." Coatings (Feb. 2021) 11(2): 226; 14 pages.
Michielse et al., "Agrobacterium-mediated Transformation of the Filamentous Fungus *Aspergillus awamori*." Nature Protocols (2008) 3(10): 1671-1678.
Miller R.K., "Quality Characteristics", in Muscle Foods: Meat Poultry and Seafood Technology, Kinsman et al. [eds], Springer Science & Media, (Mar. 2013) Chapter 11, 37 pages.
Millipore Sigma Database Search "Chelators", 2023, pp. 1-4.
Mitchell et al., [Eds.] "Solid-State Fermentation Bioreactors." Springer Verlag, Berlin/Heidelberg (2006); TOC in 12 Pages.
Mitcheson et al., "Cultured adult cardiac myocytes: Future applications, culture methods, morphological and electrophysiological properties". Cardiovasc Res. (1998) 39: 280-300.
Molvinger et al., "Porous chitosan-silica hybrid microspheres as a potential catalyst". Chem Mater. (2004) 16(17): 3367-3372.
Monmaturapoj et al., "Influence of preparation method on hydroxyapatite porous scaffolds". Bull Mater Sci. (2011) 34(7): 1733-1737.
Moore D., "Fungal Morphogenesis." Cambridge University Press, Cambridge, UK; (1998) TOC in 8 Pages.
Moore D., "Tolerance of Imprecision in Fungal Morphogenesis." In Proceedings of the 4th Meeting on the Genetics and Cellular Biology of Basidiomycetes (Mar. 1998) pp. 13-19.
Mushroom Growers' Handbook 1, "Oyster Mushroom Cultivation". Part II, Chapter 5, (2005) pp. 75-85.
Mushroom Growers' Handbook 2, "Shiitake Bag Cultivation", Part I Shiitake. Published by Mush World (2005) Chapter 4, pp. 73-90 and pp. 105-109.
Mushroom Source, "Aspen Wood Shavings for Mushroom Cultivation", Website (2015) in 2 pages.
Naknean et al., "Factors Affecting Retention and Release of Flavor Compounds in Food Carbohydrates." Inter'l Food Res J. (2010) 17(1): 23-34.
Newaz et al., "Characterization of Balsa Wood Mechanical Properties Required for Continuum Damage Mechanics Analysis." Proceedings of the Institution of Mechanical Engineers, Part L: Journal of Materials: Design and Applications (2016) 230(1): 206-218.
National Institute of Health (NIH/NIBIB), "Tissue Engineering and Regenerative Medicine", Retrieved Sep. 24, 2018 from https://www.nibib.nih.gov/science-education/science-topics/tissue-engineering-and-regenerative-medicine in 13 pages.
Norvell L., Fungi Biology. Encyclopedia.(2002); 2 pages.
Novoselova et al., "Cocultivation of Pleurotus ostreatus (Jacq.) P. Kumm. with yeasts". Moscow University Biol Sciences Bulletin (2011) 66(3): 102-105.
Nussinovitch "Polymer Macro-and Micro-Gel Beads: Fundamentals and Applications", DOI 10.1007/978-1-4419-6618_2, Springer Science & Business Media LLC (2010) TOC in 8 Pages.
OCDE—Organisation for Economic Co-operation and Development, Environment, Health and Safety Publications Series on the Safety of Novel Foods and Feeds, No. 26, Consensus Document on Compositional Considerations for New Varieties of Oyster Mushroom [*Pleurotus ostreatus*]: Key Food and Feed Nutrients, Anti-nutrients and Toxicants; Paris Nov. 2013, 42 pages.
Pacquette et al., "Simultaneous determination of chromium, selenium, and molybdenum in nutritional products by inductively coupled plasma/mass spectrometry: Single-laboratory validation", J of AOAC International (Jul. 2011) 94(4): 1240-1252.
Pang et al., "Facile fabrication of gradient density organic aerogel foams via density gradient centrifugation and UV curing in one-step", J Sol-Gel Sci Technol. (Nov. 2018) 85: 243-250.
Passauer U. et al., "Pilze in Höhlen" [Cave Mushrooms]. Denisia (2016) 37: 211-224.
Pathway-27, "Beta-glucan", Aug. 2012, retrieved from http://http://www.pathway27.eu/topstory/beta-glucan/ on Oct. 7, 2021 in 2 pages.

(56) References Cited

OTHER PUBLICATIONS

Paz et al., "One Step Construction of Agrobacterium-Recombination-ready-plasmids (OSCAR): An Efficient and Robust Tool for ATMT Based Gene Deletion Construction in Fungi." Fungal Gen Biol. (2011) 48(7): 677-684.
Peksen et al., "Favourable Culture Conditions for mycelial growth of Hydnum repandum, a medicinal mushroom." African Journal of Traditional, Complementary and Alternative Medicines (2013) 10(6): 431-434.
Peng et al., "Microbial biodegradation of polyaromatic hydrocarbons". FEMS Microbiol Rev. (2008) 32:927-955.
Perez et al., "Myxococcus xanthus induces actinorhodin overproduction and aerial mycelium formation by Streptomyces coelicolor." Microbial Biotech. (2011) 4(2): 175-183.
Peter et al., "High Terpene Pines: Transforming existing and enabling new forest biorefineries". 2013; 1 page.
Philippoussis et al., "Production of Mushrooms Using Agro-Industrial Residues as Substrates", in Biotechnology for Agro-Industrial Residues, Chapter 9, (2009) pp. 163-187.
Phillips E., "Lignocellulose-degrading Microbes Give Plants New Life", American Soc Microb. (Mar. 25, 2022) 6 pages.
Poppe J., Mushroom Growers' Handbook 1, 2004, Part II. Chapter 5, "Substrate", pp. 80-81.
Pardo-Gimenez et al., "Cultivation of Pleurotus ostreatus Using Supplemented Spent Oyster Mushroom Substrate". Inter'l Horticult Congress Science HorticultPeople (IHC2010): Inter'l Symp., Aug. 22, 2010; (pp. 267-272).
Picornell-Buendía et al., "Agronomic Assessment o Spent Substrates for Mushroom Cultivation". BASE. Jan. 1, 2016; 12 pages.
Pompei et al., "The Use of Olive Milling Waste-Water for the Culture of Mushrooms on Perlite". Acta Horticulturae (1994) 361:179-185.
PubMLST (Public databases for Molecular Typing and Microbial Genome Diversity), "Isolate Bacillus Subtilis ATCC 6051", retrieved Sep. 15, 2022 from PubMLST; 1 page.
Rai et al., "Production of Edible Fungi", in Fungal Biotechnology in Agricultural, Food, and Environmental Applications, D.K. Arora [Ed.], Marcel Dekker, Inc., (2003), Chapter 21, pp. 383-404.
Roshita et al., "Effect of exposure to different colors light emitting diode on the yield and physical properties of grey and white oyster mushrooms", AIP Conference Proceedings (Nov. 2018) 2030(1): 020110 in 8 pages.
Ross, P., "Pure Culture" 1997-Present; URL: <http://billhoss.phpwebhosting.com/ross/index.php?kind>; downloaded Dec. 14, 2016 in 11 pages.
Royse et al., "Influence of substrate wood-chip particle size on shiitake (*Lentinula edodes*) yield". Bioresource Technology (2001) 76(3): 229-233.
Sansinenea et al., "Secondary Metabolites of Soil *Bacillus* spp."; Biotechnol Lett. (2011) 33: 1523-1538.
Sapak et al., "Effect of endophytic bacteria on growth and suppression of Tganoderma infection in oil palm". Int J Agric Biol. (2008) 10(2): 127-132.
Schaner et al., "Decellularized Vein as a Potential Scaffold for Vascular Tissue Engineering." J Vascular Surg. (2004) 40(1): 146-153.
Schirp et al., "Production and characterization of natural fiber-reinforced thermoplastic composites using wheat straw modified with the fungus *Pleurotus ostreatus*". J Appl. Polym Sci. (2006) 102: 5191-5201.
Scholtmeijer et al., "Effect of introns and AT-rich sequences on expression of the bacterial hygromycin B resistance gene in the basidiomycete Schizophyllum commune". Appl Environ Microbiol. (2001) 67(1): 481-483.
Schritt et al., "Spent Mushroom Substrate and Sawdust to Produce Mycelium-based Thermal Insulation Composites". J Cleaner Prod. Sep. 1, 2021;313: 127910 in 8 pages.
Schuurman J., "Unique agar Pearls." YouTube video; Feb. 16, 2012, <https://www.youtube.com/watch?v=8GqTTOHETPQ>; 1 page.
Science Daily, May 7, 2007, retrieved from the Internet; http://www.sciencedaily.com/releases/2007/05/070506085628.htm., 3 pages.
Seamon K.B., "Forskolin: Unique Diterpene Activator of Adenylate Cyclase in Membranes and in Intact Cells." PNAS (1981) 78(6): 3363-3367.
Sharma et al., "Effect of Supplementation of Substrate with Brans and Oil Cakes on Yield of Oyster Mushroom (*Pleurotus* spp.)". Indian Phytopathol. 2009;62(3): 341-344.
Silverman J., "Development and Testing of Mycelium-based Composite Materials for Shoe Sole Applications." Thesis Spring 2018; Retrieved from the Internet: URL: http://udspace.udel.edu/bitstream/handle/19716/23768/Silverman_udel_006M_13300.pdf?sequence=1&isAllowed=y; (Apr. 1, 2018); 99 pages.
Sinotech et al., (2015): retrieved from the Internet http://www.sinotech.com/compressionAndTransferMolding.html., 4 pages.
Slater, M. "Young SoRo Entrepreneur Develops Environmentally Friendly Insulation." The Herald of Randolph. Jun. 21, 2007, pp. 1-2.
Staib et al., "Differential expression of the NRG1 repressor controls species-specific regulation of chlamydospore development in Candida albicans and Candida dubliniensis." Molecular Microbiol. (2005) 55(2): 637-652.
Stamets P., "Mycelium Running". Ten Speed Press (2005); pp. 18, 56, 58, 59, 85, 149, 157, 160 and 291 only.
Stamets P., "Growing Gourmet and Medicinal Mushrooms", (1993) Chapter 21; p. 363. (Best Available Copy).
Stanev et al., "Open Cell Metallic Porous Materials Obtained Through Space Holders. Part I: Production Methods, A Review". JMSE (2016) 139(5): 21 pages.
Stephens et al., "Bringing Cultured Meat to Market: Technical, Socio-political, and Regulatory Challenges in Cellular Agriculture." Trends in Food Science & Technology (2018) 78: 155-166.
Stewart B., "Concrete Fence Posts: Fact Sheet", Texas Agriculture Extension Service, Texas A & M University (1975) Article L-1368 in 4 pages.
Sundari et al., "Freeze-drying vegetative mycelium of Laccaria fraterna and its subsequent regeneration". Biotechnology Techniques (1999) 13: 491-495.
Tapias et al., Decellularized scaffolds as a platform for bioengineered organs, Curr Opin Organ Transplant (Apr. 2014) 19(2): 145-152.
Tartar et al., "Differential expression of chitin synthase (CHS) and glucan synthase (FKS) genes correlate with the formation of a modified, thinner cell wall in in vivo-produced Beauveria bassiana cells." Mycopathologia (2005) 160(4): 303-314.
Téllez-Jurado et al., "Expression of a heterologous laccase by Aspergillus niger cultured by solid-state and submerged fermentations." Enzyme Microbial Tech. (2006) 38(5): 665-669.
Téllez-Téllez et al., "Growth and laccase production by Pleurotus ostreatus in submerged and solid-state fermentation." Appl Microbiol Biotechnol. (2008) 81(4): 675-679.
Thomas et al., "Growing Orchids in Perlite". In Perlite Plant Guide, The Schundler Company 1951, pp. 1-6, downloaded from http://www.schundler.com/index.html, archived on May 11, 2015.
Timberpress—"How Do Mushrooms Grow So Quickly.", downloaded from the internet: www.timberpress.com/blog/2017/01/how-do-mushrooms-grow-so-quickly, download Feb. 27, 2018 in 7 Pages.
Trinci et al., "II. Unrestricted Growth of Fungal Mycelia", The Mycota—Growth, Differentiation and Sexuality by Wessels et al. [Eds], Springer, Berlin, Heidelberg, (1994) Chapter II: 175-193.
Udawatte et al., "Solidification of xonotlite fibers with chitosan by hydrothermal hot pressing". J Mater Sci. Lttrs. (2000) 45(6): 298-301.
Ugalde U., "Autoregulatory Signals in Mycelial Fungi" in The Mycota: A Comprehensive Treatise on Fungi as Experimental Systems for Basic and Applied Research. K. Esser [Ed.] Springer Publisher, 2nd Edition (2006) Chapter 11; pp. 203-213.
Universal Oil Field, "Sawdust", downloaded from universaloilfield.org on Aug. 23, 2018, 4 pages.
University of Sydney, "Competition Between Fungi". Webpage, accessed Jul. 16, 2014—http://bugs.bio.usyd.edu.au/learning/resources/Mycology/Ecology/competition.shtml in 3 pages.

(56) References Cited

OTHER PUBLICATIONS

Valencia et al., "Synthesis and application of scaffolds of chitosan-graphene oxide by the freeze-drying method for tissue regeneration". Molecules. Oct. 16, 2018;23(10): 2651 in 16 pages.
Vandelook et al., "Current State and Future Prospects of Pure Mycelium Materials". Fungal Biol Biotech. Dec. 2021;8(1): 10 pages.
Van Mil J., "The Valorisation of Mycelium Waste Streams for Cost-efficient Production of Mycelium Materials and Operationalisation of the Circular Bioeconomy". Thesis Research Project, Leiden University; Jun. 2022; 58 pages.
Vara et al., "Cloning and expression of a puromycin N-acetyl transferase gene from Streptomyces alboniger in Streptomyces lividans and *Escherichia coli*". Gene (1985) 33(22): 197-206.
Varma et al., "Porous calcium phosphate coating over phosphorylated chitosan film by a biomimetic method". Biomaterials (1999) 20(9): 879-884.
Vetchinkina et al., "Bioreduction of Gold (III) Ions from Hydrogen Tetrachloaurate . . . " Scientific Practical J Health Life Sciences No. 4, ISSN 22188-2268, (2013) pp. 51-56.
Visser et al., "Pseudoxylaria as stowaway of the fungus-growing termite nest: Interaction asymmetry between Pseudoxylaria, Termitomyces and free-living relatives". Fungal Ecology (2011) 4(5): 322-332.
Volk (2003) "Tom Volk's Fungus of the Month for Oct. 1998". This month's fungus is *Pleurotus ostreatus*; the Oyster mushroom, pp. 1-4, downloaded from http://botit.botany.wise.edu/toms_fungi/oct98.html on May 8, 2015.
Voronin et al., "Carbon and Nitrogen Isotope Composition of the Wood of *Pinus sylvestris*, *Betula pendula* and *Populus tremula*". Paleontological J., Dec. 2020;54(8): 819-824.
Wagner A. "Mycelium Biking—Eco-Design at its Best", Master's Thesis at Lulea University of Technology (2016) in 92 pages.
Wang et al., "Influence of fungal elicitors on biosynthesis of natamycin by Streptomyces natalensis HW-2". Appl Microbiol Biothechnol. (2003) 97: 5527-5534.
Wang et al., "Chemical and structural factors influencing enzymatic saccharification of wood from aspen, birch and spruce". Biomass Bioengin. (2018) 109: 125-134.
Wan-Mohtar et al., "The morphology of Ganoderma lucidum mycelium in a repeated-batch fermentation for exopolysaccharide production", Biotechnology Reports (2016) 11: 2-11.
Weaver et al., "The stomatopod dactyl club: a formidable damage-tolerant biological hammer". Science (2012) 336(6086): 1275-1280.
Wikipedia, "Water gel (plain)", Wikipedia Contributors downloaded Aug. 21, 2017 in 1 Page.
Wikipedia, "Wood", downloaded on Nov. 26, 2018, 1 page.
Wikipedia, "Soil". Downloaded on Sep. 14, 2022, 51 pages.
Wikipedia, "Compost". Downloaded on Sep. 14, 2022, 21 pages.
Williams, J. "Waste not: Will the furniture of the future be made from leftovers?", Financial Times Jan. 11, 2019 (Mogu—Radical by Nature); in 9 page.
Woller R. "The Pearl Oyster Mushroom", University of Wisconsin Website (2011) in 2 pages.
Wösten et al., "How a fungus escapes the water to grow into the air", Current Biology. (1999) 9(2): 85-88.
Wösten et al., "Growing Fungi Structures in Space", ACT Research Category/Space Architecture; Noordwijk, The Netherlands (Oct. 15, 2018) in 17 pages.
Wrona T., 10 Powerful Nutrients Found Only in Meat. Jun. 9, 2022. 20 pages.
Xiao et al., "A Water-soluble Core Material for Manufacturing Hollow Composite Sections." Comp. Structures (2017) 182: 380-390.
Yamasaki et al., "A hydrothermal hot-pressing method: Apparatus and Application". J Mater Sci Lttrs. (1986) 5(3): 355-356.
Yang et al., "Medicinal Mushroom Ganoderma lucidum as a Potent Elicitor in Production of t-Resveratrol and t-Peceatannol in Peanut Calluses". J Agric Food Chem. (2010) 58(17): 9518-9522.
Yang et al., "Physical and mechanical properties of fungal mycelium-based biofoam", J Mater Civil Engin. (Jul. 2017) 29(7): 04017030 in 9 pages.
Zadrazil et al., "Influence of CO2 Concentration on the Mycelium Growth of Three Pleurotus Species", European J. Appl. Microbiol., vol. 1, pp. 327-335 (1975).
Zeigler et al., "The Origins of 168, W23, and other Bacillus subtilis Legacy Stains", J Bacter. (Nov. 2008) 190: 6983-6995.
Zeng Z., "Cosmetic composition for cleaning skin, comprises glossy ganoderma spores and collagens, content of glossy ganoderma spores in composition and content of collagens in composition", WPI/Thomson (Feb. 5, 2006) 7: Accession #2007-057767; Abstract of CN1732887A; in 11 pages.
Ziegler et al., "Evaluation of Physico-mechanical Properties of Mycelium Reinforced Green Biocomposites Made from Cellulosic Fibers", Appl Engin Agricult. (2016) 32(6): 931-938.
Zimin et al., "The MaSuRCA genome assembler". Bioinformatics (2013) 29(21): 2669-2677.
Zivanovic et al., "Changes in Mushroom Texture and Cell Wall Composition Affected by Thermal Processing". J Food Service (2004) 69: 44-49.
Insider Business, "How Mushrooms are Turned into Bacon and Styrofoam—World Wide Waste", Apr. 11, 2021; XP093055859; Retrieved from the Internet: URL:https://wwINSIDER Business, "How Mushrooms are Turned into Bacon and Styrofoam—World Wide Waste", Apr. 1, 20211; XP093055859; Retrieved from the Internet: URL:https://www.youtube.com/watch?v=uznXI8wrdag&t=325s&ab_channel=InsiderBusiness [retrieved on Jun. 2023] in 4 pages.
International Search Report and Written Opinion for PCT/US2023/017737, mailed Jul. 6, 2023 in 15 pages.

SYSTEMS AND METHODS FOR HARVESTING MYCELIA

CROSS-REFERENCE TO RELATED APPLICATIONS

This application is related to U.S. Provisional Patent Application No. 63/329,263, filed Apr. 8, 2022, entitled "SYSTEMS AND METHODS FOR HARVESTING MYCELIA" and U.S. Provisional Patent Application No. 63/341,965, filed May 13, 2022, entitled "SYSTEMS AND METHODS FOR HARVESTING MYCELIA," the disclosures of which are incorporated herein by reference in their entirety.

INCORPORATION BY REFERENCE TO ANY PRIORITY APPLICATIONS

Any and all applications for which a foreign or domestic priority claims is identified in the PCT Request as filed with the present application are hereby incorporated by reference under 37 C.F.R. § 1.57. This application claims the benefit of U.S. Provisional Patent Application No. 63/329,263, filed Apr. 8, 2022, entitled "SYSTEMS AND METHODS FOR HARVESTING MYCELIA" and U.S. Provisional Patent Application No. 63/341,965, filed May 13, 2022, entitled "SYSTEMS AND METHODS FOR HARVESTING MYCELIA," the disclosures of which are incorporated herein by reference in their entirety.

FIELD

This application relates generally to mycelia suitable for use in the manufacture of mycelium-based food products, textile products, leather-like materials, petroleum-based product alternatives, foams, composites, and other products, and in particular, to systems and methods for harvesting mycelia for incorporation into said products.

BACKGROUND

There is increasing demand for mycelia-based products, both in the food industry (for example, as an animal-based meat-substitute) and in other non food-related industries, such as textiles, packaging, and others, as such products offer the potential for environmentally-friendly alternatives to currently-favored products in these industries.

Given that such mycelia-based products are relatively new to the industrial world, there is also a need for mycelial harvesting methods that are repeatable and energy efficient, while providing high quality and quantity mycelium-based products that are useful, practical, and adaptable for larger scale growth/manufacturing facilities.

SUMMARY

For purposes of summarizing the invention and the advantages achieved over the prior art, certain objects and advantages of the invention have been described herein. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

In a first aspect, a method of harvesting an aerial mycelium panel is described. The method can include providing a mycological growth web comprising a growth matrix, an extra-particle aerial mycelial growth, and a growing net. The method can further include moving the web in a longitudinal direction. The method can further include dividing the web along a separation zone to detach the extra-particle aerial mycelial growth from the growth matrix and form an aerial mycelium. The method can further include cutting the aerial mycelium in a transverse direction and across a width of the aerial mycelium to form an aerial mycelium panel. The method can further include compressing at least a portion of the aerial mycelium panel along at least one of the width of the panel and in the transverse direction.

In various aspects, a perforated sheet can be positioned along the separation zone, and dividing the web can include peeling the growth matrix and the sheet from the extra-particle aerial mycelial growth. In various aspects, the separation zone can include a plane of separation, and dividing the web can include cutting the web along the plane of separation.

In various aspects, the cutting and the dividing are performed by the same cutting instrument.

In various aspects, the method can further include stopping the web during at least one of cutting the aerial mycelium and compressing at least a portion of the aerial mycelium panel.

In various aspects, compressing can include compressing substantially the entirety of the panel in the transverse direction.

In various aspects, the method can further include misting the aerial mycelium or the aerial mycelium panel prior to the compressing.

In various aspects, the method can further include diverting the growth matrix and the aerial mycelium or aerial mycelium panel relative to each other. In some aspects, the growth matrix can include a plurality of pieces after the diverting step, the method can further include reducing at least some of the plurality of pieces in size. In some aspects, a method of forming a first and a second aerial mycelium panel using this method is described, wherein moving can include moving the first aerial mycelium panel at a first angle and moving the second aerial mycelium panel at a second angle, wherein the first angle and the second angle are different relative to each other.

In various aspects, the method can further include moving the aerial mycelium panel from a first elevation to a second elevation. In some aspects, moving the aerial mycelium panel can include moving the aerial mycelium panel at a substantially non-horizontal angle.

In various aspects, the method can include using a trolley apparatus to implement at least one of said method steps.

In various aspects, the method can include a monitoring step for identifying deviant morphology in said web and preventing its inclusion in a final product made from said web. In various aspects, the monitoring step can be carried out by a monitoring device mounted on either a movable or portable trolley apparatus.

In another aspect, a system for harvesting an aerial mycelium is described. The system can include a net pulling system configured to longitudinally move a mycological growth web. The system can include a dividing instrument configured to divide the web along a separation zone to detach the extra-particle aerial mycelial growth from the growth matrix and form an aerial mycelium. The system can include a cutting instrument configured to move in a transverse direction and cut across a width of the aerial mycelium to form an aerial mycelium panel. The system can include a compression tool configured to compress at least a portion of the aerial mycelium panel along at least one of the width of the panel and in the transverse direction.

In various aspects, the cutting instrument can include a wire saw. In some aspects, the wire saw is configured to oscillate along the width of the aerial mycelium. In some aspects, the dividing instrument can include the wire saw, wherein the separation zone can include a plane of separation, and the system can further include a controller configured to move the wire saw to a position to allow the web to be cut along the plane of separation while the net pulling system longitudinally moves the mycological growth web. In some further aspects, the controller can be further configured to stop the net pulling system to allow the wire saw to cut across the width of the aerial mycelium and form the aerial mycelium panel.

In various aspects, the compression tool is configured to compress substantially the entirety of the panel in the transverse direction.

In various aspects, the system can further include one or more sprayers configured to spray the aerial mycelium or the aerial mycelium panel.

In various aspects, the system can further include an elevator configured to move the aerial mycelium panel from a first elevation to a second elevation. In some aspects, the elevator can be configured to move the aerial mycelium panel at a substantially non-horizontal angle. In some further aspects, the elevator can be angularly adjustable and configured to move a second aerial mycelium panel at a different angle relative to the substantially non-horizontal angle.

In various aspects, the system can further include a diverter positioned at or downstream of the dividing instrument, wherein the diverter is configured to divert the growth matrix and the aerial mycelium or aerial mycelium panel relative to each other. In some further aspects, the growth matrix can include a plurality of pieces, and the system can further include a reducer configured to reduce at least some of the plurality of pieces in size.

In another aspect, a method of harvesting an aerial mycelium panel is described. The method can include providing a mycological growth web comprising a growth matrix, an extra-particle aerial mycelial growth, and a growing net. The method can include monitoring said mycological growth web by at least one monitoring device, in order to detect and record a deviant morphology in said mycological growth web. The method can include communicating a position of said deviant morphology in said mycological growth web to a downstream method step function. The method can include moving the web in a longitudinal direction. The method can include dividing the web along a separation zone to detach the extra-particle aerial mycelial growth from the growth matrix and form an aerial mycelium. The method can include cutting the aerial mycelium in a transverse direction and across a width of the aerial mycelium to form an aerial mycelium panel, whereby said cutting step avoids inclusion of deviant morphology in said web which position had been communicated from said monitoring device. The method can include compressing at least a portion of the aerial mycelium panel along at least one of the width of the panel and in the transverse direction.

In another aspect, a method of harvesting an aerial mycelium panel is described. The method can include providing a mycological growth web comprising a growth matrix, an extra-particle aerial mycelial growth, and a growing net. The method can include moving the web in a longitudinal direction. The method can include dividing the web along a separation zone to detach the extra-particle aerial mycelial growth from the growth matrix and form an aerial mycelium.

In some aspects, the method can further include cutting the aerial mycelium in a transverse direction and across a width of the aerial mycelium to form an aerial mycelium panel; and compressing at least a portion of the aerial mycelium panel along at least one of the width of the panel and in the transverse direction.

In some aspects, the aerial mycelium does not contain a visible fruiting body. In some aspects, the aerial mycelium consists essentially of, or consists of, fungal mycelium.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

The features and advantages of the methods and compositions described herein will become more fully apparent from the following description and appended claims, taken in conjunction with the accompanying drawings. These drawings depict only several embodiments in accordance with the disclosure and are not to be considered limiting of their scope. In the drawings, similar reference numbers or symbols typically identify similar components, unless context dictates otherwise. In some instances, the drawings may not be drawn to scale.

DETAILED DESCRIPTION

Figure 1:
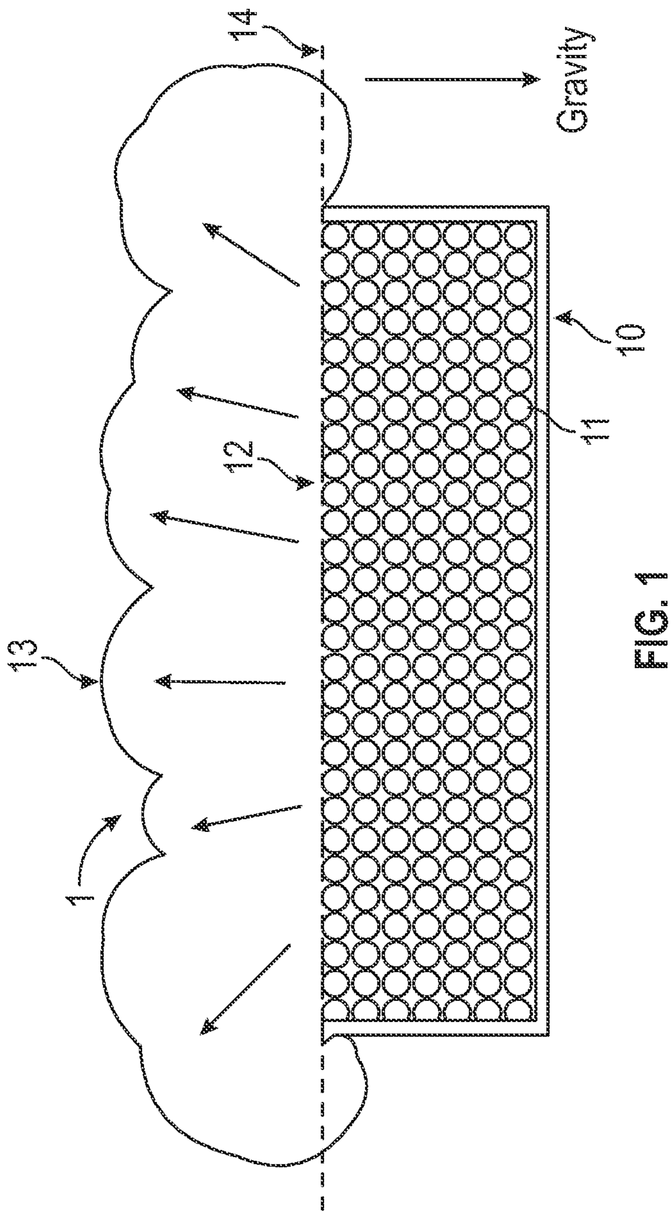
FIG. 1 illustrates an embodiment of negative gravitropic growth of aerial mycelia, that may be used in accordance with the described harvesting methods.

U.S. Pat. No. 11,277,979, International PCT Patent Application No. WO2019/099474A1, the entirety of which are incorporated herein by reference thereto, except where inconsistent with the disclosure herein, describe methods of growing a mycological biopolymer material and products resulting therefrom. However, it is a challenge to design mycelial harvesting methods that are repeatable and energy efficient, as well as adaptable to produce multiple aerial mycelia product configurations, while providing, high quality and quantity mycological (e.g., mycelium-based) products.

Described herein are embodiments of systems, apparatus, and methods to harvest biopolymer material, such as a mycological material comprising mycelia (e.g., aerial mycelia). The mycelia products that are harvested can be used in the food industry (for example, as an animal-based meat-substitute product, and one that may present to the consumer a product that offers the appearance and texture of traditional animal-based meat material (i.e. beef, pork, poultry and seafood), and in other industries, such as textiles, packaging, and others. It is an object of the present invention to provide mycelial harvesting methods and systems that are repeatable and energy efficient, while providing high quality and quantity mycelium-based products. It is a further object of the present invention to provide harvesting methods that offer flexibility and adaptability so that the methods are capable of toggling back and forth between various harvesting step options (among several available, such as in sequence of steps, or overall steps utilized) as to accommodate either varying product designs (with each design demonstrating differing desired product attributes), or to accommodate various manufacturing facility spaces or equipment availability.

The following discussion presents detailed descriptions of the several embodiments of the present disclosure shown in the Figures. These embodiments are not intended to be limiting, and modifications, variations, combinations, etc., are possible and within the scope of this disclosure.

Definitions

"Mycelium" as used herein refers to a connective network of fungal hyphae, with mycelia being the plural form of mycelium.

"Hyphae" as used herein refers to branched filament vegetative cellular structures that are interwoven to form mycelium.

The aerial mycelia of the present disclosure are growth products obtained from a growth matrix incubated for a period of time (i.e., an incubation time period) in a growth environment, as disclosed herein.

"Substrate" as used herein refers to a material or surface thereof, from or on which an organism lives, grows and/or obtains its nourishment. In some embodiments, a substrate provides sufficient nutrition to the organism under target growth conditions such that the organism can live and grow without providing the organism a further source of nutrients; such a substrate may be referred to herein as a "nutritive substrate."

"Growth media" or "growth medium" as used herein refers to a matrix containing a substrate and an optional further source of nutrition that is the same or different than the substrate, wherein the substrate, the nutrition source, or both are intended for fungal consumption to support mycelial growth.

"Growth matrix" as used herein refers to a matrix containing a growth medium and a fungus. In some embodiments, the fungus is provided as a fungal inoculum; thus, in such embodiments, the growth matrix comprises a fungal-inoculated growth medium. In other embodiments, the growth matrix comprises a colonized substrate.

"Growth environment" as used herein refers to an environment that supports the growth of mycelia, as would be readily understood by a person of ordinary skill in the art in the mycelial cultivation industry. A growth environment can contain a growth atmosphere having a gaseous environment of carbon dioxide ($CO_2$), oxygen ($O_2$) and a balance of other atmospheric gases including nitrogen ($N_2$), and is further characterized as having a relative humidity. Since mushrooms are the fruiting bodies of mycelium, it should be recognized that the conditions under which mushrooms develop from mycelium (i.e. the conditions that actually trigger mycelium to produce their mushroom fruit) may vary from the conditions useful to maintain mycelium in its mycelial form (without the production of fruiting bodies). Essentially, the growth environment necessary to promote the extended growth of mycelium may vary from the growth environment necessary to trigger the formation of mushrooms, and may also depend on the mushroom strain being grown. A growth environment of the present disclosure can be further characterized as having an atmospheric pressure as would be readily understood by a person of ordinary skill in the art in the mycelial cultivation industry, again subject to differences necessary to trigger actual mushroom formation.

"Determinate growth" as used herein refers to growth that occurs until a maximum final dimension is achieved while growth continues to occur in other dimensions. Either determinate or indeterminate mycelial growth above the surface of a growth matrix defines a mycelium's native thickness. Ideally in one embodiment, determinate growth should not include the production of fruiting bodies, alternatively of few fruiting bodies per unit area.

"Indeterminate growth" as used herein refers to growth that expands indefinitely in a given direction as long as mycelial growth is occurring. Ideally in one embodiment, indeterminate growth should not include the production of fruiting bodies, alternatively of few fruiting bodies per unit area.

"Aerial mycelium" as used herein refers to mycelium obtained from extra-particle aerial mycelial growth, and which is substantially free of growth matrix.

"Appressed mycelium" as used herein refers to a continuous mycelium obtained from extra-particle appressed mycelial growth, and which is substantially free of growth matrix.

"Extra-particle mycelial growth" (EPM) as used herein refers to mycelial growth, which can be either appressed or aerial.

"Extra-particle aerial mycelial growth", as used herein refers to a distinct mycelial growth that occurs away from and outward from the surface of a growth matrix, and which can exhibit negative gravitropism. In a geometrically unrestricted scenario, extra-particle aerial mycelial growth could be described as being negatively gravitropic, positively gravitropic, or neutrally gravitropic, aerial, and radial in which growth will expand in all directions from its point source. In some embodiments, external forces, such as airflow, can be applied towards (e.g., approximately perpendicular to) the growth substrate, and in some embodiments, through the growth substrate, for example, to create downward aerial mycelium growth in the direction of gravity.

"Extra-particle appressed mycelial growth" as used herein refers to a distinct mycelial growth that is surface-tracking (thigmotropic), is determinate in growth substantially orthogonal to the surface of a growth matrix, is indeterminate in growth substantially parallel to the surface of the growth matrix. Extra-particle appressed mycelial growth can exhibit positive gravitropism.

"Fruiting body" as used herein refers to a stipe, pileus, gill, pore structure, or a combination thereof.

"Negative gravitropism" as used herein refers to mycelial growth that preferentially occurs in the direction away from gravity.

"Positive gravitropism" as used herein refers to growth that preferentially occurs in the direction of gravity.

FIG. 1 illustrates an example of extra-particle aerial mycelial growth (e.g., negative gravitropic growth). Referring to FIG. 1, the growth unit 1 can include a single tray container 10 with a bottom and side walls. The tray container contains growth matrix 11 (circles). Some growth conditions result in EPM initiating across the exposed surface 12. Next, EPM continues to expand forming a contiguous, semi-contiguous, or discontiguous volume of extra-particle aerial mycelial growth 13 as shown. As described further herein, in some embodiments, the negative gravitropic growth can be implemented on a mycological growth web. The web can include the growth matrix and the extra-particle aerial mycelial growth, placed on a growing net, without having continuous side walls or even a continuous bottom wall. The web can be a standard size, such as a 63"W×38 L', 63"W×98'L or any of many other web configurations. Other sizes can be implemented, including lengths up to 90, 100 feet, or more.

The extra-particle aerial mycelial growth 13 can be various heights. In some embodiments, the growth is about 3-4 inches high above the growth matrix 11. This can be achieved in up to two weeks of growth. In some embodiments, the system, such as the system 100 may include one or more sensors (not shown) to monitor the height of the extra-particle aerial mycelial growth 13. In some embodiments, as noted, the growth can be implemented without the single tray container shown in FIG. 1.

In some embodiments, a separation zone 14 (dot-dashed line) can be defined as a zone where the extra-particle aerial mycelial growth can be detached from the growth matrix 11 to form an aerial mycelium. It will be understood that although the separation zone 14 in FIG. 1 is shown extending contiguously along the interface between the growth matrix 11 (circles) and the extra-particle aerial mycelial growth 13, in some embodiments, the separation zone 14 will be positioned a relatively small distance from the interface. For example, the separation zone 14 may be positioned such that the growth matrix 11 includes a thin layer of extra-particle aerial mycelial growth remaining thereupon. This layer is thin, but can be of any sufficient height to prevent any growth matrix 11 from remaining on the aerial mycelium after detachment (e.g., ⅛ inch or ¼ inch) from the extra-particle aerial mycelial growth 13, and to allow for a cleaner, sharper detachment. This can be beneficial, for example, in food applications, where the product resulting from the aerial mycelium may not be allowed to include any significant amount of growth matrix 11. The separation zone 14 need not be linear as shown, although in some embodiments, it can form a plane extending along the dot-dashed lines shown and approximately perpendicular into the view as shown, to form a plane of separation. In some embodiments, a sheet (such as a perforated sheet) can be positioned along the separation zone 14, which may assist in later separating the aerial mycelium from the growth matrix 11.

Figure 2:
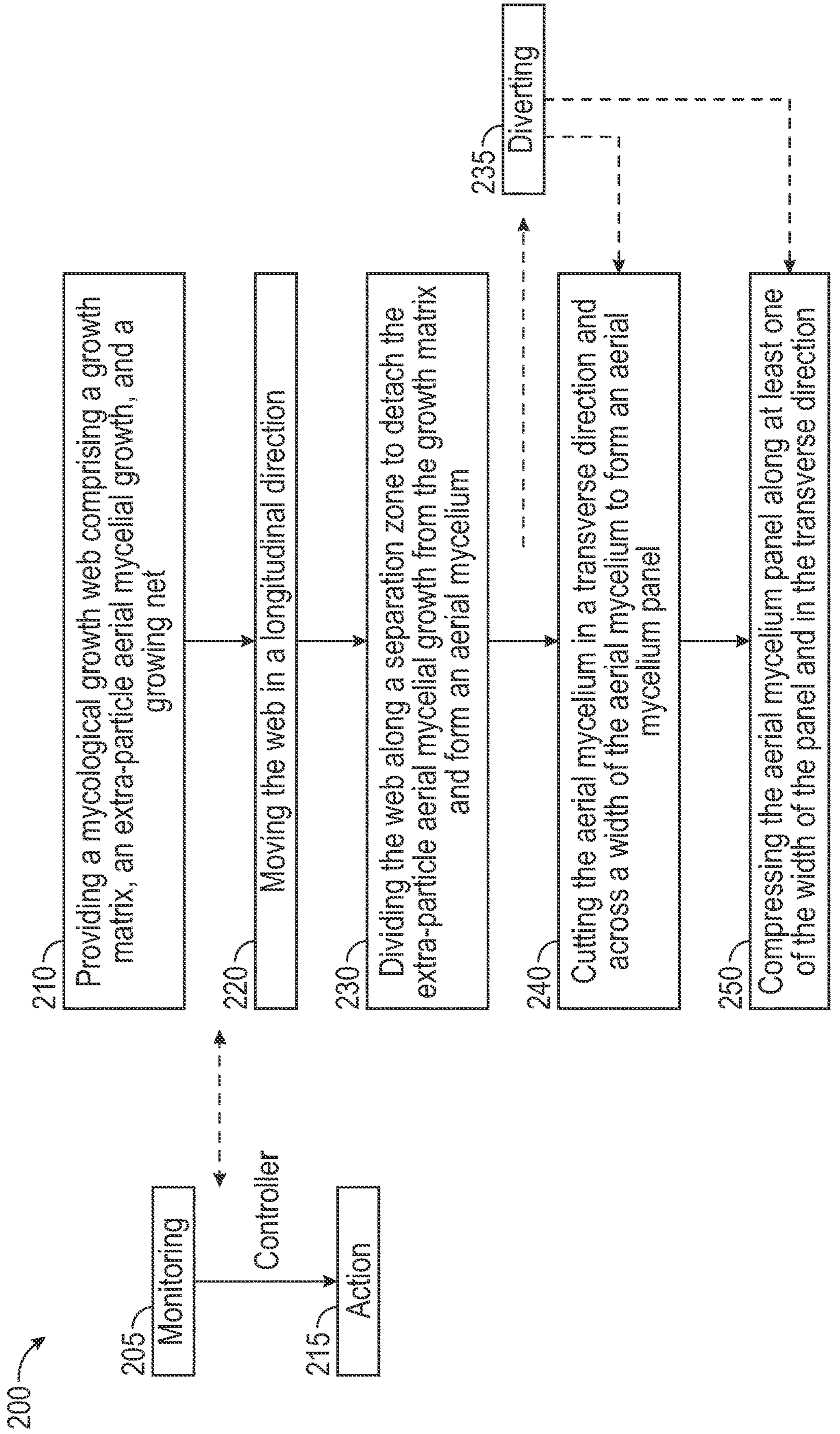
FIG. 2 illustrates a flow diagram of a method of harvesting an aerial mycelium panel.

FIG. 2 illustrates a method 200 of harvesting an aerial mycelium panel. Systems and apparatus that can implement the method 200 are described further herein. The method 200 can include a step 210 of providing a mycological growth web comprising a growth matrix, an extra-particle aerial mycelial growth, and a growing net, as described herein, for example with respect to FIG. 1 above. The method 200 can include a step 220 of moving the web in a longitudinal direction. The method 200 can include a step 230 of dividing the web along a separation zone to detach the extra-particle aerial mycelial growth from the growth matrix and form an aerial mycelium. The method 200 can include a step 240 of cutting in a transverse direction and across a width of the aerial mycelium to form an aerial mycelium panel. The method 200 can include a step 250 of compressing at least a portion of the aerial mycelium panel along at least one of the width of the panel and in the transverse direction. Thus, the method 200 can include a step of compressing at least a portion of the aerial mycelium panel in at least one or two directions. The method 200 can repeat steps 220-240 to form two or more aerial mycelium panels.

In some embodiments, the method 200 can include a diverting step 235 at approximately the same time as, or after, the dividing step 230. The diverting step 235 can divert the growth matrix and the aerial mycelium (or aerial mycelium panel) relative to each other. For example, the diverting step 235 can include moving the growth matrix and the aerial mycelium (or aerial mycelium panel) relative to each other, such that a distance between the growth matrix and the aerial mycelium (or aerial mycelium panel) increases during the diverting step. This post-diverting distance between the growth matrix and the aerial mycelium (or aerial mycelium panel) can be greater than the distance between the growth matrix and the aerial mycelium (or aerial mycelium panel) after the dividing step 230. For example, this post-dividing distance between the growth matrix and the aerial mycelium (or aerial mycelium panel) may be approximately zero inches. For example, after the dividing step 230 in which the growth matrix and the aerial mycelium have become detached from each other, but absent the diverting step 235, the detached growth matrix and aerial mycelium may rest upon each other (e.g, from gravity) and thus maintain contact therebetween. The diverting step 235 can move the growth matrix and/or the aerial mycelium (or aerial mycelium panel) relative to each other such that the post-diverting distance is at a value such the detached growth matrix and the aerial mycelium (or aerial mycelium panel) are no longer in contact with each other. The diverting step can allow for further, separate processing of the growth matrix and/or the aerial mycelium (or aerial mycelium panels), and prevent contamination of the downstream aerial mycelium products with growth matrix. For example, the diverting step 235 can allow for the aerial mycelium to be cut 240, compressed 250, and moved for packaging, and/or can allow the depleted growth matrix to be separated and recycled. The diverting step 235 can be performed at or downstream of the dividing step 230, the cutting step 240, and/or the compressing step 250. In some embodiments, a reducing step is implemented after the diverting step to reduce the size of the growth matrix pieces.

In some embodiments of method 200, a sheet (e.g., a perforated or other sheet through which mycological growth can pass) can be positioned along the separation zone, and the dividing the web step 230 can include peeling the growth matrix and the sheet from the extra-particle aerial mycelial growth.

In some embodiments of method 200, the separation zone can include a plane of separation, and the dividing the web step 230 can include cutting the web along the plane of separation.

In some embodiments of method 200, the dividing step 230 and the cutting step 240 can be performed by the same cutting instrument. For example, a wire saw can be implemented that performs both steps 230 and 240.

In some embodiments, method 200 can include stopping the web during at least one of, or both of, cutting the aerial mycelium step 240 and compressing at least a portion of the aerial mycelium panel step 250.

In some embodiments of method 200, compressing step 250 can include compressing substantially the entirety of the panel in the transverse direction. In some embodiments, the compressing step 250 can include selectively compressing only some portions of the panel, to provide variations in topology and/or density across the panel's length, width or depth. In other embodiments, the contact surface of the compression unit can also include surface features which impart different levels of compression to the underlying aerial mycelium material. As an example, the contact surface of the compression unit may include voids surrounded by solid surfaces which create desired variations in density in the compressed material.

In some embodiments, method 200 further includes misting the aerial mycelium or the aerial mycelium panel prior to the compressing step 250. For example, a misting step may be implemented after the moving step 220, dividing step 230 or cutting step 240. The misting can provide some moisture on the aerial mycelium or panel, for example, to lubricate the panel and allow for the panel to release more easily from a compression tool that provides the compressing step 250.

In some embodiments, method 200 can further include moving the aerial mycelium panel from a first elevation to a second elevation, as described further herein. Various elevations may be desired in the process to allow for efficient storage of produced material while it is being grown in vertically oriented configurations. By having the flexibility to adjust from one elevation to another, a whole compendium of elevations may be used, which eventually direct the grown material to elevations useful to human or robotic operators. In some of these embodiments, the aerial mycelium panel can be moved at a substantially non-horizontal angle. In some embodiments, method 200 can be implemented to form a first and a second aerial mycelium panel, and the first aerial mycelium panel can be moved at a first angle and the second aerial mycelium panel can be moved at a second angle, wherein the first angle and the second angle are different relative to each other.

In some embodiments, one or more of the steps of method 200 can be affected by a monitoring step 205. The monitoring step 205 can include a monitoring of various data, features, properties or characteristics of the products, intermediate products, or equipment within any of the steps of method 200, as well as any preceding, subsequent, or intervening steps. In some embodiments, the monitoring information is provided as feedback to a controller (e.g., controller 980 (FIG. 5)), which, in response to that feedback, submits an output causing an action step 215 to be taken. In some embodiments, the monitoring step 205 comprises monitoring a mycological growth web (or panel) by at least one monitoring device, in order to detect and record a deviant morphology in said mycological growth web (or panel). The monitoring step 205 can include communicating a position of said deviant morphology in said mycological growth web (or panel) to a downstream method step function. Examples of the monitoring step 205, the controller, and the action step 215 and the control (e.g., closed loop control) that can be implemented therewith, is described further herein, for example, with reference to FIG. 14. It will be understood that the various steps in method 200 or other processes described herein can be performed manually or automatically (e.g., with a controller and/or other automation equipment), unless otherwise inconsistent with the disclosure herein.

Figure 3:
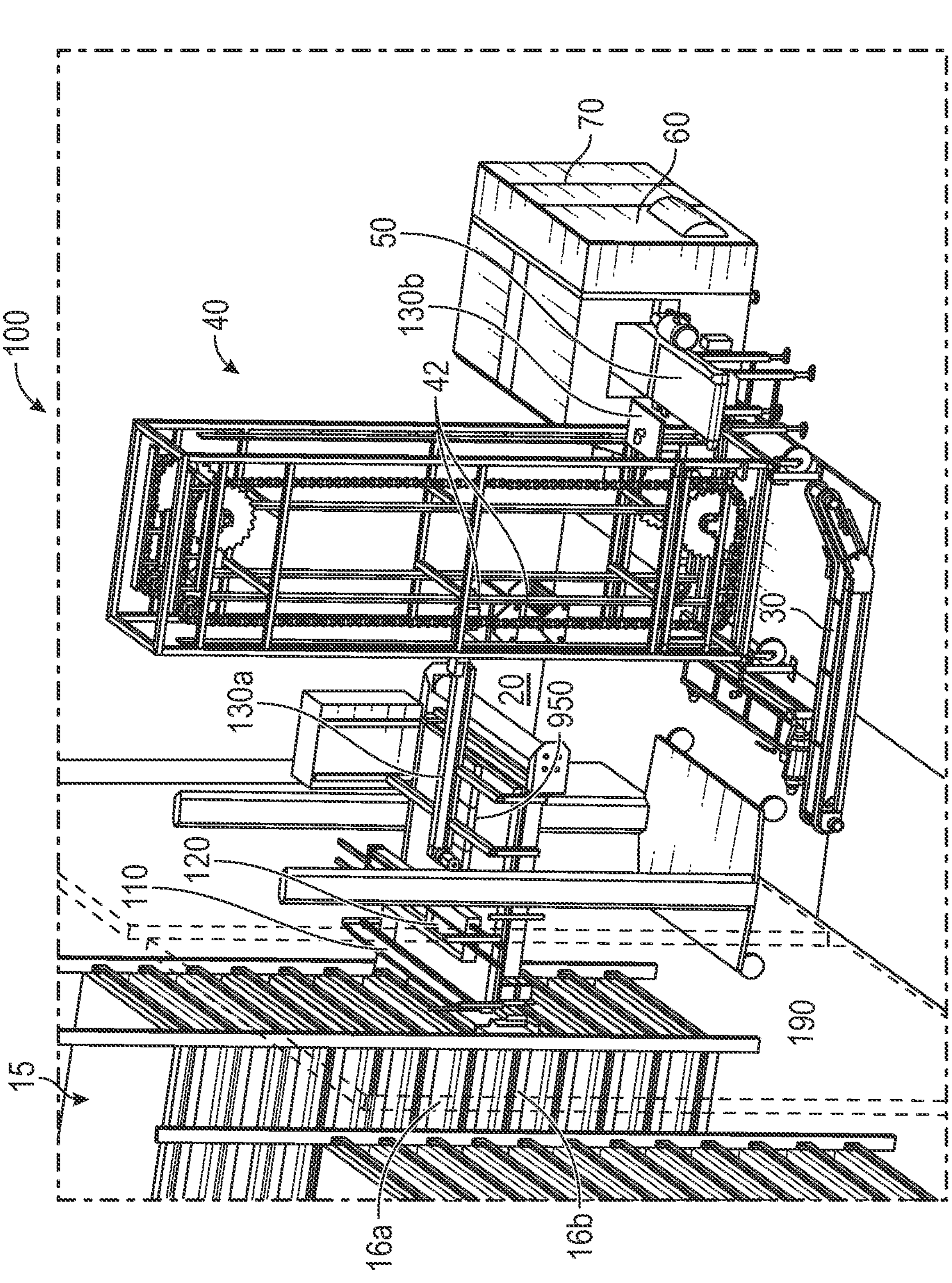
FIG. 3 is an isometric view of a system for harvesting aerial mycelia.
Figure 4:
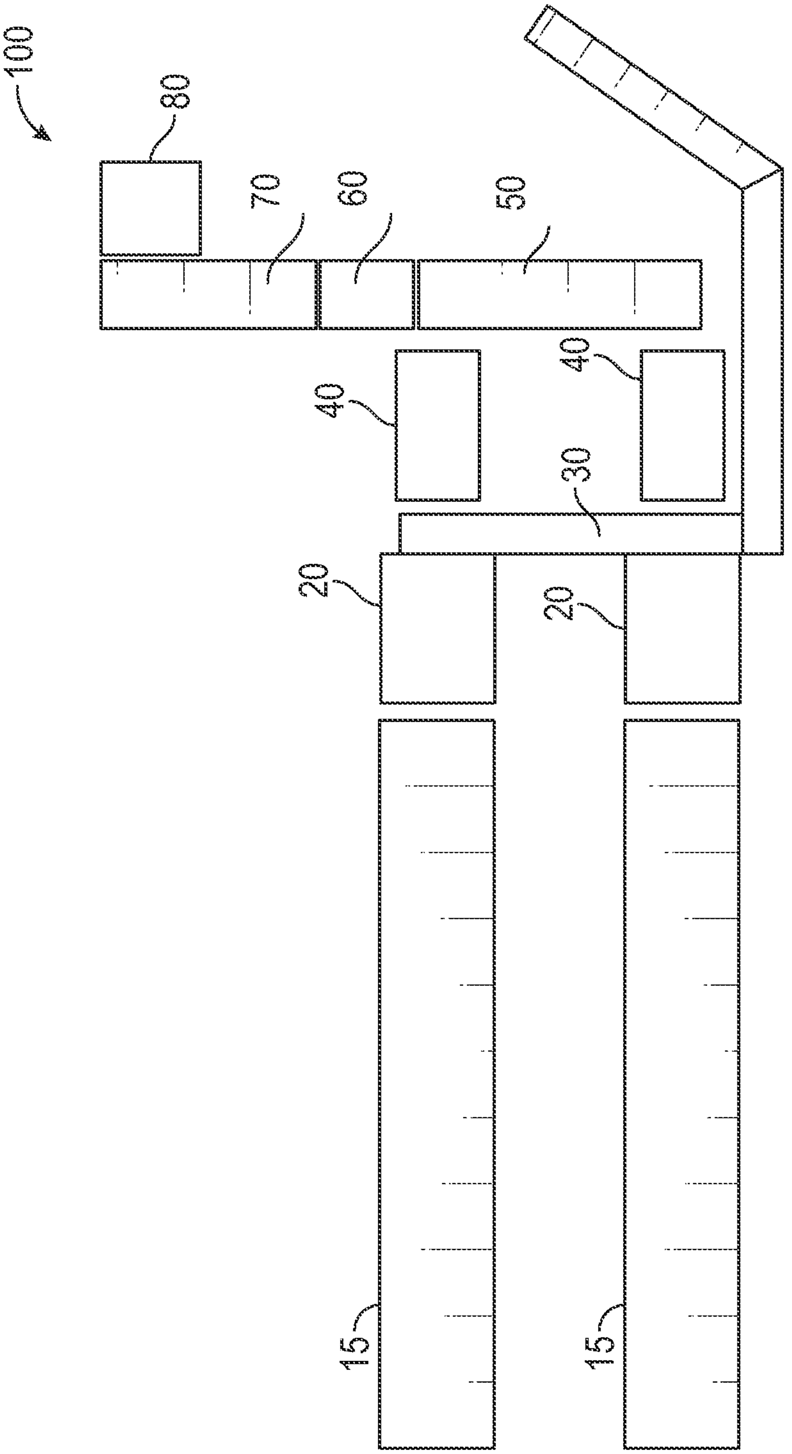
FIG. 4 illustrates a top view of a system for harvesting aerial mycelia.
Figure 5:
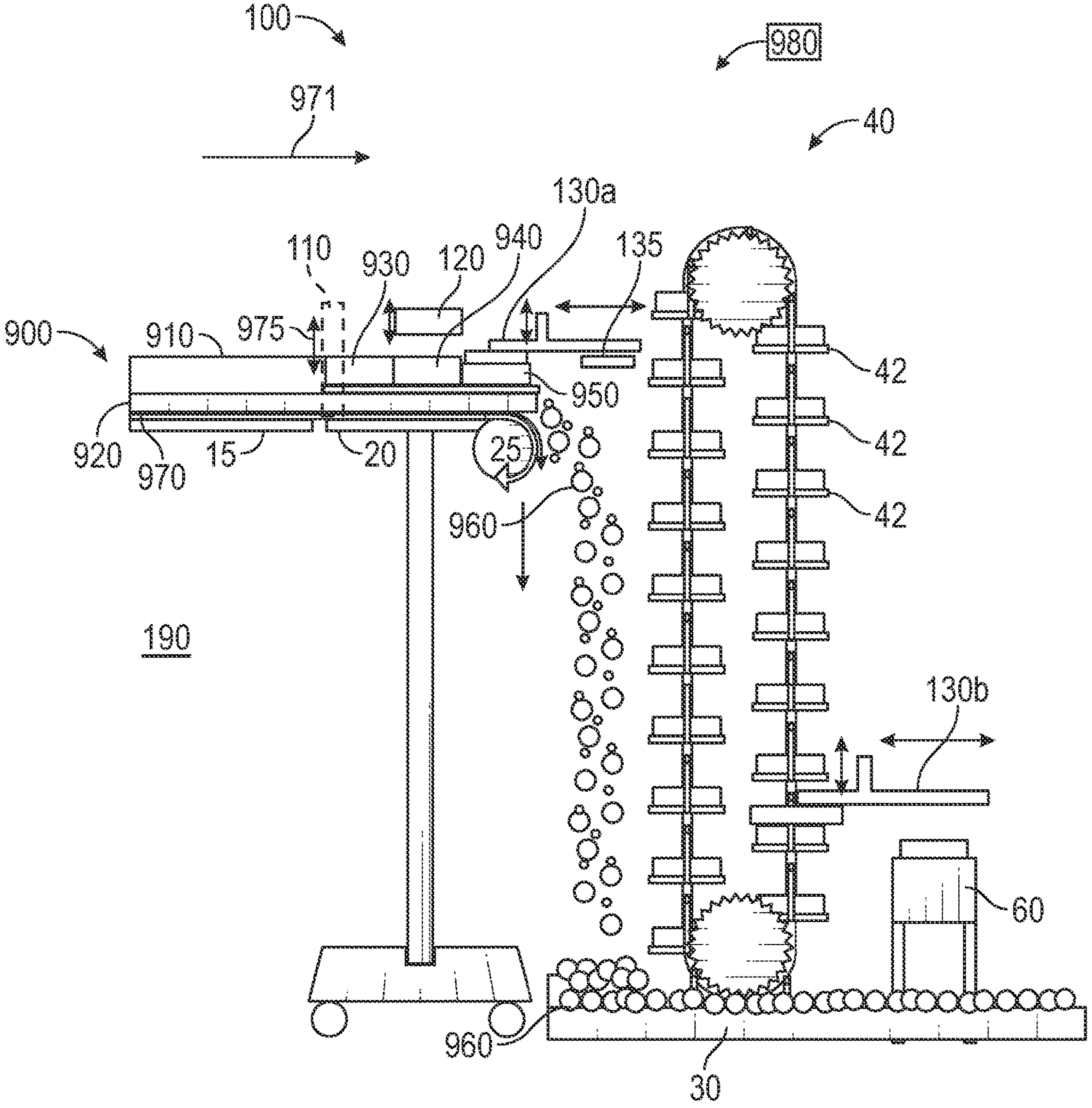
FIG. 5 illustrates a side view of the system of FIG. 3.

FIG. 3 is an isometric view of an embodiment of a system 100 for harvesting an aerial mycelia panel. FIG. 4 illustrates a top view of a system similar to the system 100 of FIG. 3, with two net pulling systems, two sets of racks, and two elevators. FIG. 5 illustrates a side view of the system 100 of FIG. 3. The system 100 can be used to implement methods for harvesting an aerial mycelium panel, for example, such as the method 200 of FIG. 2.

With references to one or more of FIGS. 3-5, the system 100 can include a net pulling system 20 configured to move a mycological growth web 900. The mycological growth web 900 can include a growth matrix 920, an extra-particle aerial mycelial growth 910, and a growing net 970.

The net pulling system 20 can move the mycological growth web 900 in a longitudinal direction 971, for example, by wrapping the growing net 970 around a spindle 25. The spindle 25 can be driven by a motor (not shown) controlled by a controller 980 (FIG. 5). In some embodiments, the spindle 25 and/or growth web 900 velocity/position can be controlled with the controller 980 and a velocity and/or position sensing device (e.g., encoder or sensor), with closed loop feedback, to allow for alignment and consistent, repeatable positioning of the cutting instrument, dividing instrument, compression tool and the panels being processed, for example, while the diameter of the rolled net increases around the spindle 25. In some embodiments, the controller may monitor and/or control a torque of the motor (not shown). For example, the controller may instruct the motor to provide an output, rotating the spindle 25 with a particular torque. The particular torque may be controlled to maintain a tension of the growing net 970 below a selected threshold, to prevent causing damage to the growing net 970, and above a selected threshold to allow for sufficient stability and processing. These components and controller 980 can also be configured to control the rotational velocity of the growing net 970 around the spindle 25 such that the longitudinal velocity of the mycological growth web 900 and aerial mycelium panel output match downstream product web movement and conveyors. In some embodiments, the spindle 25 may be removable and/or replaceable. For example, the spindle 25 may be removed after an aerial mycelium has been harvested and the growing net 970 has been wrapped around the spindle 25. The spindle 25 may be removed, and the growing net 970 may be removed from the spindle 25. The spindle 25 may then be reattached for subsequent uses. In another example, the spindle 25 and a growing net 970 wrapped thereon may be removed after the aerial mycelium have been processed and removed from a first shelf **16*a*, and a new second spindle may replace the spindle 25 prior to the processing of aerial mycelium from a second shelf 16*b***.

The growing net 970 can comprise one or more layers of a perforated or nonperforated material, or combinations thereof, such as a plastic, nylon (e.g., nylon weave), woven, non-woven, composite, non-composite or any other flexible or non-flexible suitable material, or multiple layers of material, for supporting and growing aerial mycelium thereupon.

In some embodiments, the mycological growth web 900 can comprise a non-flexible material to provide a more rigid growing surface, such as one or more rigid panels or other linked materials, which can be moved within the net pulling system 20 by the growing net 970, or through other components, with or without the growing net 970.

The net pulling system 20 can pull the mycological growth web 900 from a shelf 16. A rack 15 can include a plurality of shelves 16 (e.g., stacked vertically), each with a mycological growth web 900, within a growth environment 190. The growth environment 190 can include one, two, or more shelves 16 (FIG. 3). The racks 15 can include various numbers of shelves 16, and can be of various heights. In some embodiments, the racks 15 include 12 shelves, and are 12-16 feet high. Thus, the net pulling system 20 can move vertically to compensate for shelves 16 at different heights.

The shelves 16 can be spaced apart from each other (e.g., vertically) a spacing height H that is sufficient to allow for the height of the desired extra-particle aerial mycelial growth 910 combined with the height of the underlying growth matrix 920, and other features of the mycological growth web 900, if any, and sufficient clearance for airflow, processing and handling. The spacing height is defined as the distance between the same two corresponding points on two adjacent shelves. For example, the spacing height can be defined as the distance from the top surface of a first lower shelf to the corresponding top surface of an adjacent upper shelf. In some embodiments, the spacing height can be in a range between about 200 mm to about 530 mm, or between about 225 mm to about 490 mm, or between about 250 mm to about 450 mm. In some embodiments, the spacing height can be less than 530 mm, less than 490 mm, or less than 450 mm. In some embodiments, the spacing height can be about 350 mm. These spacing heights can be advantageous because the nature of the mycelial growth herein requires less spacing, and thus can allow for an increased number of shelves and higher output than conventional mushroom cultivation. This is because in traditional mushroom farming, the harvest is pulled manually from the beds. This means the beds are spaced apart by enough distance that humans can reach in to see and pick the crop.

The system 100 can include a dividing instrument configured to divide the web 900 along a separation zone to detach the extra-particle aerial mycelial growth 910 from the growth matrix 920 and form an aerial mycelium 930. For example, in some embodiments, the dividing instrument can comprise a sheet (e.g., a perforated sheet; not shown) that can be positioned between the growth matrix 920 and the extra-particle aerial mycelial growth 910, along a separation zone, or along a plane of separation, for example, as described with reference to FIGS. 1 and 2. The sheet can allow the growth matrix 920 and the sheet to be peeled from the extra-particle aerial mycelial growth 910 without a cutting instrument.

The system 100 can include a cutting instrument configured to move in a transverse direction (e.g., vertically, as shown by the arrows 975 in FIG. 5) between a non-cutting position (spaced from an outer surface of the aerial mycelium) and a cutting position (e.g., below an upper surface of the extra-particle mycelial growth or aerial mycelium that is being cut). In some embodiments, the dividing instrument comprises a cutting instrument, which can perform both the dividing step 230 and cutting step 240 as described with respect to FIG. 2. In some embodiments, the cutting instrument and the dividing instrument can comprise a wire saw 110. Other types of cutting instruments can be implemented and provide similar function, such as a reciprocating saw (e.g., a reciprocating blade or wire), or a recirculating saw (e.g., a recirculating band or wire), any of which can be configured to move in two axes—e.g. across the width of the aerial mycelium, and transversely, and/or a single axis "guillotine" cut (e.g., transversely), or combinations thereof. In some embodiments, a rotating cutting instrument, such as a cutting mill or "pizza cutter" configuration, can be implemented. In some embodiments, a double cake slicer blade can be implemented.

With reference to FIG. 2 and FIGS. 3, 5, 6 and 9, during the dividing step 230, the wire saw can be moved to a cutting position (e.g., transversely downwards) that is at a position to allow the web to be cut along the plane of separation. Said cut will occur across a width W of the aerial mycelium 930 (e.g., the width extending into the plane of FIG. 5, and shown as width W in FIG. 9) when the cutting instrument is at this cutting position and the net pulling system 20 longitudinally moves the mycological growth web 900. In some embodiments, the dividing step 230 comprises cutting horizontally. In some embodiments, the dividing step 230 comprises cutting with a reciprocating saw, recirculating saw (e.g. bandsaw) or a cutting mill.

After the web has been cut along the plane of separation, during step 240 (FIG. 2), the cutting instrument can be moved from the cutting position to non-cutting position (e.g., transversely, e.g., transversely upwards) to cut across a width W of the aerial mycelium 930 (e.g., the width extending into the plane of FIG. 5, and shown as width W in FIG. 9) to form an aerial mycelium panel 940 from the aerial mycelium 930. During one or more of these steps, the wire saw 110 can be configured to oscillate along the width of the aerial mycelium 930 (into the plane of FIG. 5).

In some embodiments, the cutting of the aerial mycelium 930 to form the aerial mycelium panel 940 can be performed in a separate operation, downstream of the dividing step, after the web has been divided along the separation zone and the extra-particle aerial mycelial growth 910 has been detached from the growth matrix 920. In some embodiments, the cutting step (and/or compression step) can be completed in a different location relative to the dividing step, such as on a different conveyor system (e.g., conveyor belt). In such embodiments, a pre-compression step of the aerial mycelium can assist with its transfer to the other location. In some embodiments, the cutting instrument can be configured to cut towards and through the upper surface of the aerial mycelium (e.g., transversely, e.g., transversely downwards) using a separate cutting instrument from that which performs the dividing step 230. In some embodiments, the cutting step 230 can include a reciprocating or guillotine function, or both.

The positioning of the cutting instrument can be controlled with the controller 980. For example, a screw-based lifting system can be implemented, which is controlled by stepper motors to precisely move the cutting instrument (e.g., wire saw) to specific heights. This could be aided with limit switches configured to move the cutting instrument (or other components of the system 100) via the controller 980 and a human-machine interface.

In some embodiments, the system 100 can include a cutting instrument, such as a wire saw that is configured with its wire extending transversely (e.g., vertically). Such a cutting instrument can be configured to move in two dimensions, for example within a plane that is substantially parallel to the plane of separation. Such an embodiment could create 2-dimensional shapes from the aerial mycelium panel 940. For example, an aerial mycelium panel might be cut into the shape of footwear components, bedding components, and other shaped consumer product parts or animal-based meat substitutes.

The system 100 can include a compression tool 120 configured to move transversely (e.g., vertically) from an upper uncompressed position to a lower compressed position. The compression tool 120 can be configured to move along the width of the panel (e.g., horizontally) between a wider uncompressed position to a narrower compressed position. Thus, the compression tool 120 can be configured to compress at least a portion of the aerial mycelium panel 940 along at least one of the width of the panel and in the transverse direction, or both. In some embodiments, the compression tool 120 can be configured to compress substantially the entirety of the panel 940 in the transverse direction. The compression tool 120 can form an aerial mycelium panel 950 which can be a desired higher density than the aerial mycelium panel 940 prior to it being compressed. The ability to compress a panel to a consistent force can be a relevant factor in affecting the grading metrics of the desired panel, such as wet density. In some embodiments, the compression tool 120 can include a pattern on its transverse-facing surface, with varying elevations and/or apertures, for example, to provide variations in topology and/or density across the panel's length and width.

In operation, a controller 980 can be configured to provide functionality to the components of system 100, for example, to control system 100 or the components thereof to perform one or more of the method steps described with respect to FIG. 2 and method 200, or other components and processes described herein. The controller 980 can provide the following functionality: while the web 900 is being longitudinally moved by the net pulling system 20 (e.g., the net 970 is being winched around the spindle 25), the wire saw 110 is in a cutting position (e.g., lowered), and the web 900 is divided along a separation zone to detach the extra-particle aerial mycelial growth 910 from the growth matrix 920 and form the aerial mycelium 930. Then the net pulling system 20 can stop, to prevent the spindle 25 from moving. This allows the wire saw 110 to move from the cutting position to the non-cutting position, and thus cut across the width (W) (FIG. 9) of the aerial mycelium 930 and form the aerial mycelium panel 940. During this movement to the non-cutting position, the wire saw 110 can be oscillated, creating "cross cuts." The wire saw 110 can be aligned, for example, a desired distance (e.g., 12") away from the compression tool 120, so that moving the web 900, by winching the net 970 the same desired distance, i.e. "indexing" the web (e.g., 12") aligns these cross-cuts with the vertical edges of the compression tool 120. The compression tool 120 then moves from the non-crush position to the crush position (e.g., vertically down) into these cross cuts separating the mycelial panels 940 from each other. The compression tool 120 can then compress the mycelial panel 940 along both the width of the panel and in the transverse direction. The simultaneous nature of this cycle is that the step of moving the compression tool 120 to the crush position and compressing a panel happens while the wire saw 110 is in the raised, "non-cut" position, and then lowered back to the "cut position" for dividing the extra-particle aerial mycelium growth 910 from the growth matrix such that the steps happen simultaneously. The serial nature of this system is that the aerial mycelium 920 that is being cut to form the aerial mycelium panel 950 (away from the rest of the upstream material) is the piece that will be compressed in the subsequent "cycle" of the process after the net is winched by the same desired distance (e.g. 12").

In some embodiments, the controller 980 may perform an emergency stop process. The controller 980 may begin the emergency stop process in response, for example, to receiving a stop input from a user, a sensor, etc. In response to receiving the stop input, the controller 980 may provide a stop command to one or more of the components of the system, such as the net pulling system 20, the wire saw 110, the compression tool 120, the transfer device 130*a*, etc. In some embodiments, the stop command may be a synchronous stop command such that all of the components of the system 100 stop at the same time.

To allow for further processing of the aerial mycelium panel 950, the harvesting system 100 can comprise an elevator configured to move (e.g., automatically, and controlled by controller 980, or manually) the aerial mycelium panel 950 from a first elevation to a second elevation. This elevation change can be beneficial, to compensate for the difference in height between the downstream processing equipment described below, the height of the particular shelf 16 for the mycological growth web 900 being processed, and/or for the height of the web pulling system 20.

In some embodiments, an elevator 40 can comprise a continuous vertical conveyor comprising a plurality of platforms 42, each of which can move a corresponding aerial mycelium panel 950 from a first elevation to a second elevation. A transfer device 130*a*, such as a movable vacuum, can move the panel from the end of the net pulling system 20 to the first elevation on elevator 40. Many transfer devices can be implemented, with or without vacuum, for example, using various types of automated grippers, robots, or other components. The transfer devices can provide motion along one or two axes, as shown by the arrows with reference to devices 130*a*, 130*b*, or more axes (e.g., into the plane of FIG. 5).

Referring to FIGS. 3 and 5, after the elevator 40 moves the panel to a second desired elevation, a second transfer device 130*b*, such as the movable vacuum shown, can move the panel from the elevator 40, for further processing. For example, as best shown in FIGS. 3 and 4, the panel can be moved by the second transfer device 130*b* to one or more of an infeed belt 50, to a flow wrapper 60, and then to a temperature control system 70. The panel can then be further packaged and palletized by a palletizer 80 (FIG. 4).

The flow wrapper 60 can wrap the panel in a film to protect the panel, mitigate contamination, and reduce aerobic exchange, to preserve the panel, prevent off-flavors and thus increase shelf life. The film can be perforated, to allow the panel to respirate, and further increase shelf life. The temperature control system 70 can keep the panel at a desired temperature prior to shipping. For example, the panel can be cooled, to allow it to continue to live, while preventing growth, to further increase shelf life.

Referring to FIG. 5, as the net 970 is rolled around the spindle 25, the growth matrix 920 can break apart and fall away from the aerial mycelium panel 950. As shown in FIGS. 3-5, the depleted growth matrix 960 can be contained and transported away from the system 100 with an outfeed system, such as the outfeed conveyor 30. The depleted growth matrix 960 can be recycled, for use in refilling the shelves 16 for future mycological growth, or for other products, such as at-home growing kits or compostable material.

Referring to FIG. 4, it will be understood that in some embodiments, two (or more) racks 15 can be implemented, and two (or more) of many components of system 100 can be implemented, to provide two (or more) processing lines, as shown. In some embodiments, only a single processing line is implemented, like that shown in FIG. 3. In some embodiments, the controller 980 may be configured to control the position of the processing line, i.e. components of the system 100. For example, the controller 980 may control the position of the components of the system 100 via one or more actuators (not shown) configured to transversely (i.e. vertically) position the components relative to another component, such as a particular shelf, to perform one or more steps of the method 200. For example, the controller 980 may position the net pulling system 20, the wire saw 110, the compression tool 120, the transfer device 130*a*, and/or other components, relative to a shelf 16, and/or with respect to each other. In some embodiments, the controller 980 may automatically move components of the system to harvest aerial mycelium from two or more shelves. The controller 980 may move the components of the system 100 based on a known height of the two or more shelves. For example, the controller 980 may position the net pulling system 20, the wire saw 110, the compression tool 120, and/or the transfer device 130*a* relative to an upper shelf 16*a* for harvesting aerial mycelium grown on the upper shelf 16*a* and subsequently reposition the components relative to a lower shelf 16*b* for harvesting aerial mycelium grown on the lower shelf 16*b*.

FIGS. 6-12B illustrate various embodiments of apparatus that can be implemented with various methods and systems for harvesting mycelia, such as the methods described herein with respect to FIG. 2, and the system 100 of FIGS. 3-5.

As described above, an aerial mycelium panel may stick to a compression tool during the compressing of the panel, which can decrease panel uniformity and quality. This sticking can be reduced in various ways. For example, the compression tool may include openings through which air or another fluid can be introduced, or an air knife, to reduce sticking and increase the likelihood of a clean release of the panel from the compression tool. In some embodiments, spray can be implemented to reduce sticking and improve a clean release, as follows.

Figure 6:
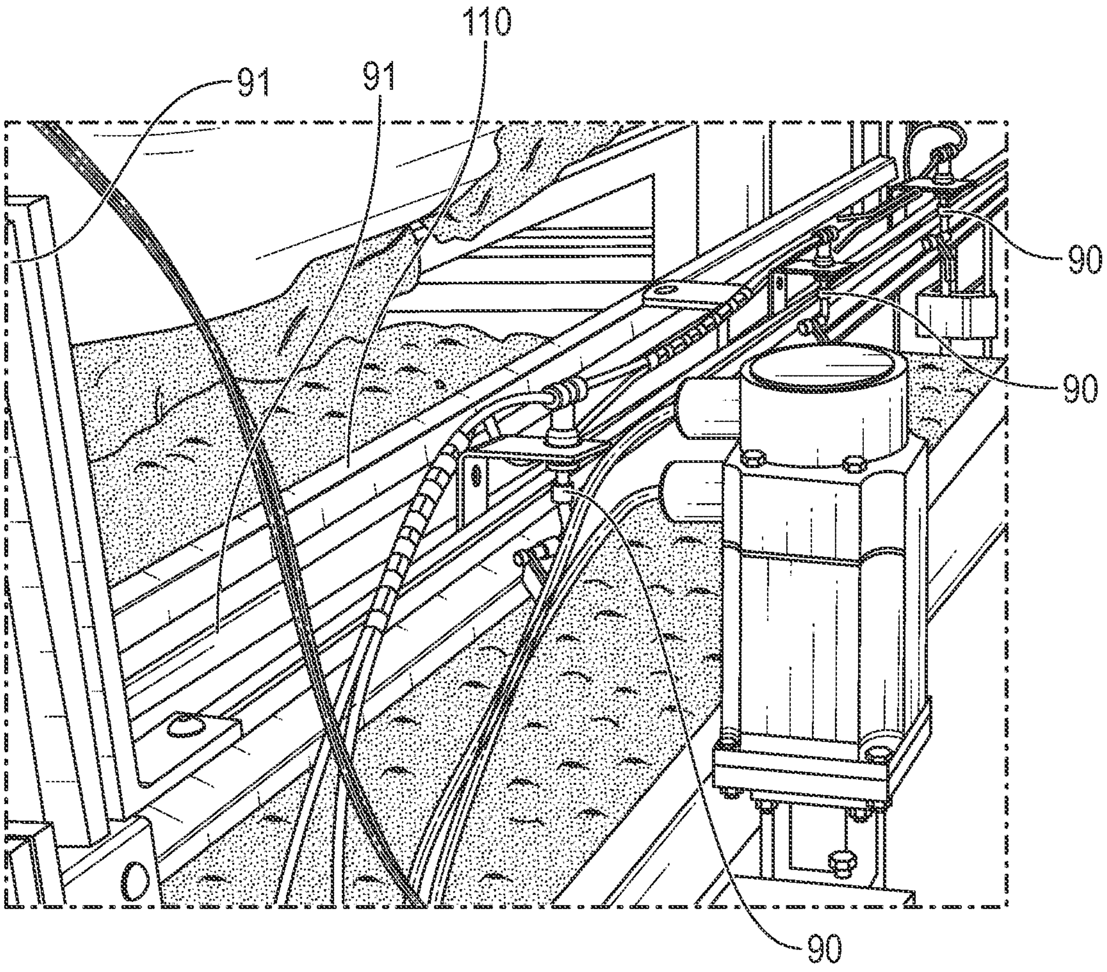
FIG. 6 shows an embodiment with misters configured to spray a mist onto the aerial mycelium or the aerial mycelium panel.

FIG. 6 shows an embodiment of a system for harvesting an aerial mycelium with misters 90 configured to spray a mist onto the aerial mycelium or the aerial mycelium panel. The mist can provide some moisture on the aerial mycelium or panel, for example, to allow for the panel to release more easily from a compression tool. FIG. 6 also provides a more detailed view showing an embodiment of the wire cutter 110 with actuators 91 that can provide the oscillation and the transverse movement of the wire cutter 110.

Figure 7A:
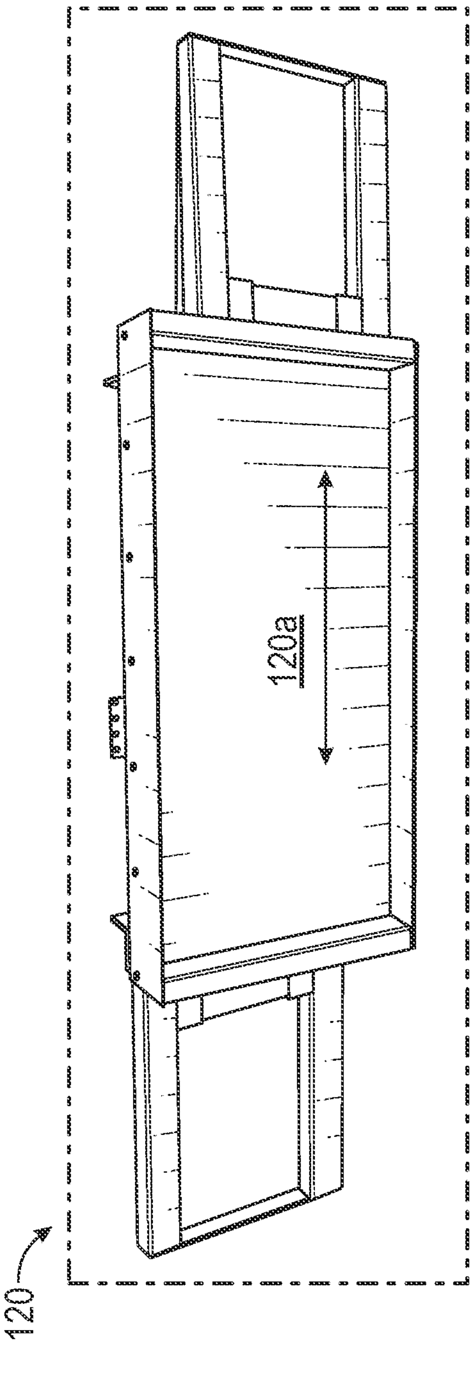
FIGS. 7A and 7B show a bottom view of an embodiment of a compression tool, in a wider uncompressed position to a narrower compressed position, respectively.
Figure 7B:
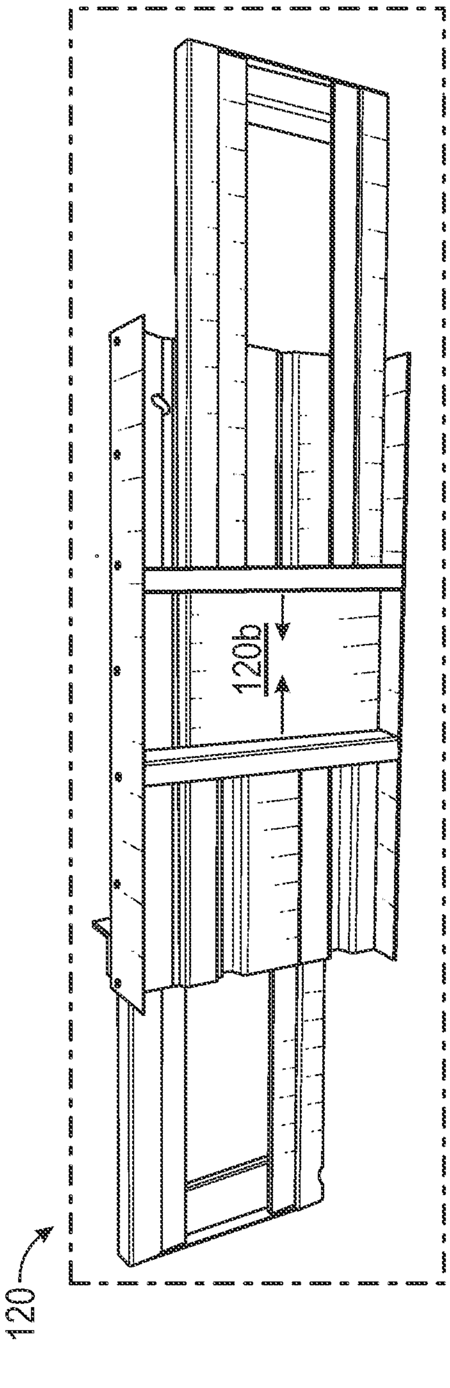

FIGS. 7A and 7B show a bottom view of an embodiment of a compression tool 120, in a wider uncompressed position 120*a* to a narrower compressed position 120*b*, respectively. The compression tool 120 is configured to compress at least a portion of an aerial mycelium panel 940 along the width of a panel and in the transverse direction.

Figure 8A:
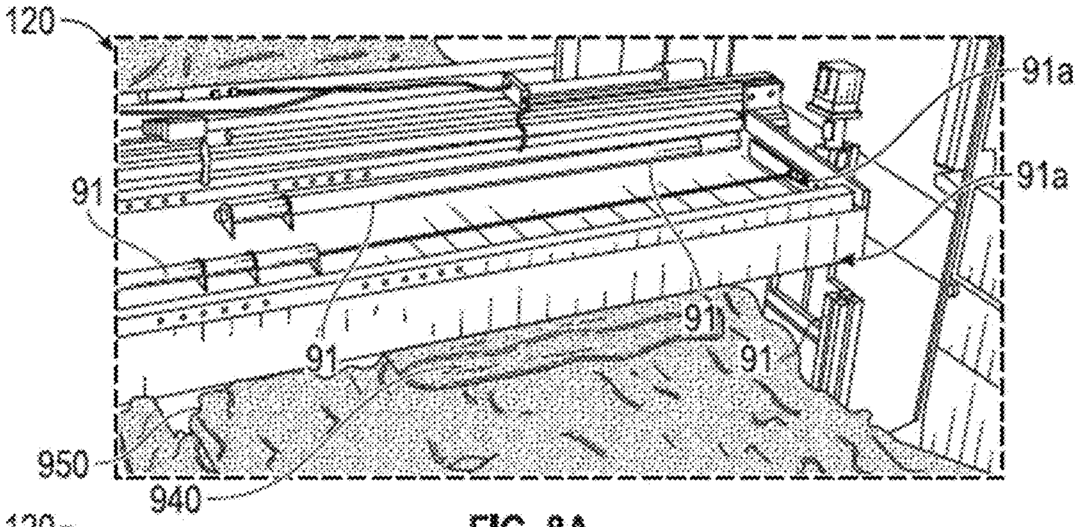
FIGS. 8A-8C show the compression tool of FIGS. 7A and 7B implemented within a system for harvesting aerial mycelia.
Figure 8B:
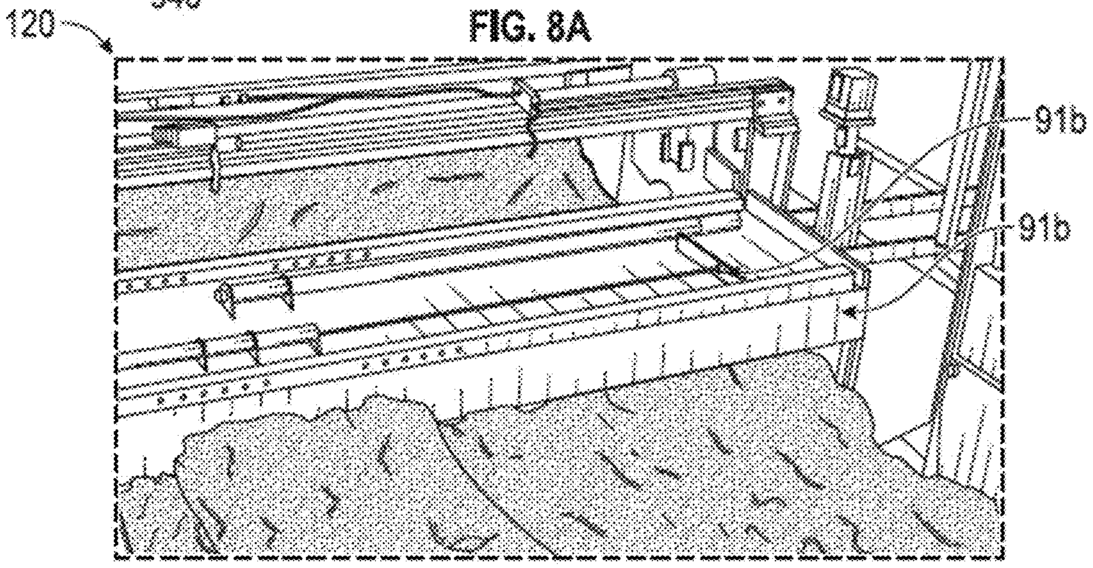
Figure 8C:
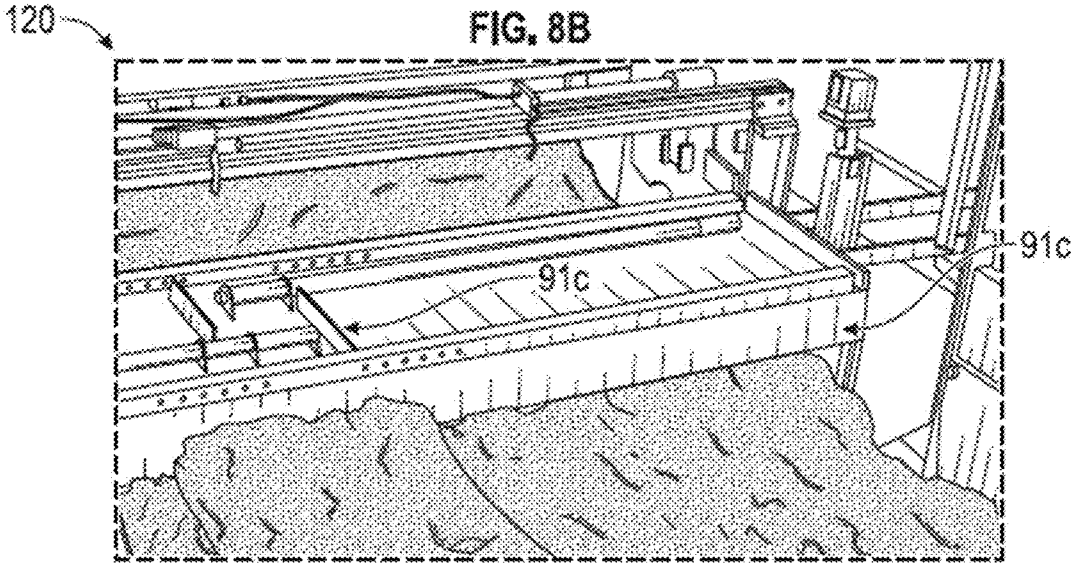

FIGS. 8A-8C show the compression tool 120 of FIGS. 7A and 7B implemented within a system such as system 100. The compression tool 120 can include actuators 91 to provide the functionality described herein. FIG. 8A shows the compression tool 120 in an upper uncompressed position and a wider uncompressed position (91*a*), above an aerial mycelium panel. In FIG. 8A, the compression tool 120 is uncompressed in a transverse (e.g., vertical) direction and along the width of the panel (e.g., in a horizontal direction). FIG. 8B shows the compression tool 120 in a lower compressed position, and a wider uncompressed position (91*b*). In FIG. 8B, the compression tool 120 is compressed in a transverse (e.g., vertical) direction and uncompressed along the width of the panel (e.g., in a horizontal direction). FIG. 8C shows the compression tool 120 in a lower compressed position and a narrower compressed position (91*c*). In FIG. 8C, the compression tool 120 is compressed in a transverse (e.g., vertical) direction and along the width of the panel (e.g., in a horizontal direction).

Figure 9:
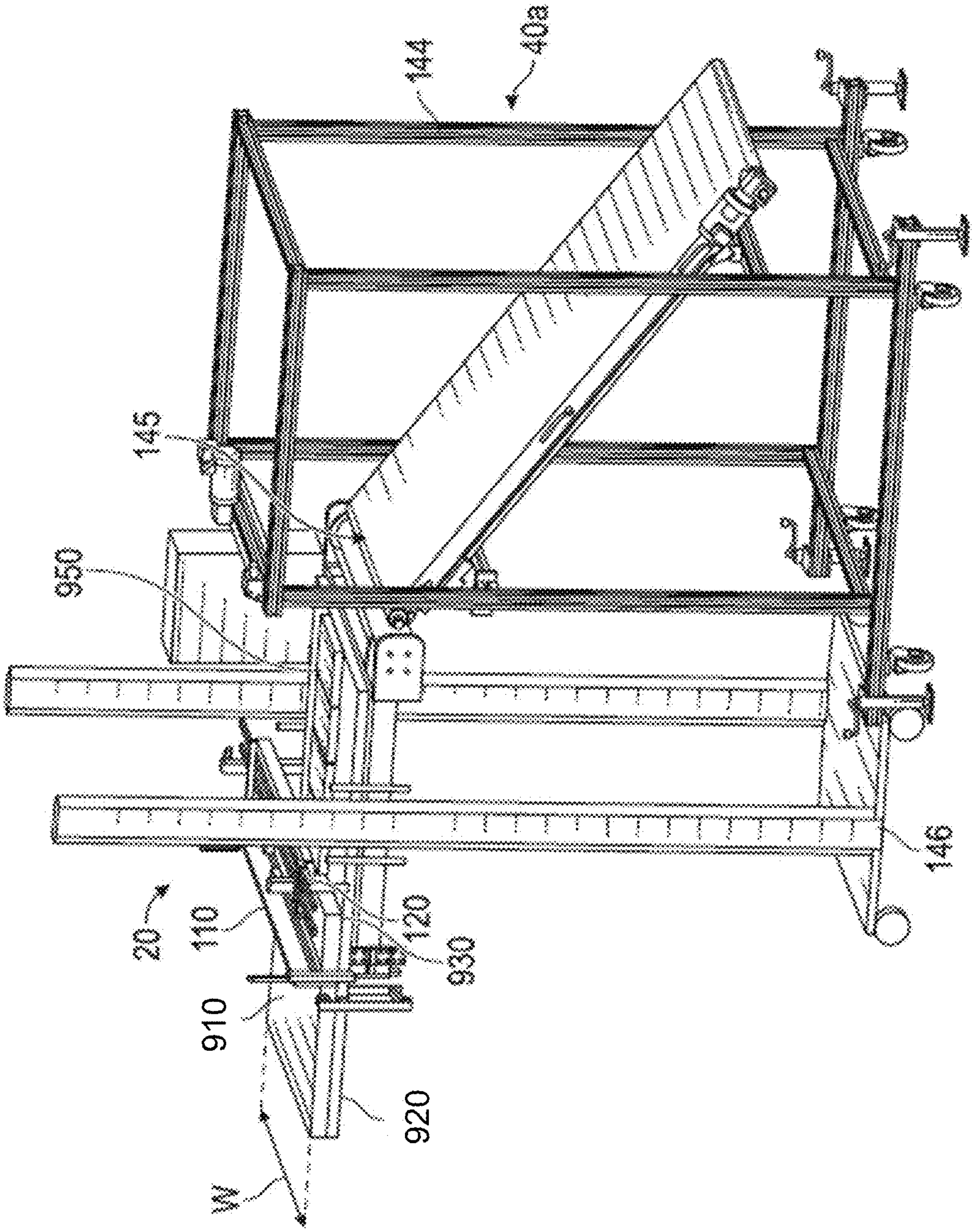
FIG. 9 shows an embodiment of an elevator downstream of a net pulling system.

FIG. 9 shows an alternative embodiment of an elevator 40*a* downstream of the net pulling system 20. Elevator 40*a* can move (e.g., manually, or automatically and controlled by a controller 980) an aerial mycelium panel 950 from a first elevation to a second elevation, similar to elevator 40 in FIGS. 3-5, or other elevators described herein. In some embodiments, elevator 40*a* can provide such functionality directly from the net pulling system 20 without a transfer device therebetween. In some embodiments, elevator 40*a* is configured to move an aerial mycelium panel 950 at a substantially non-horizontal angle. This can be accomplished, for example, through a ramped conveyor 145 as shown. The net pulling system can also be adjustable in height, along one or more support members 146.

Figure 10A:
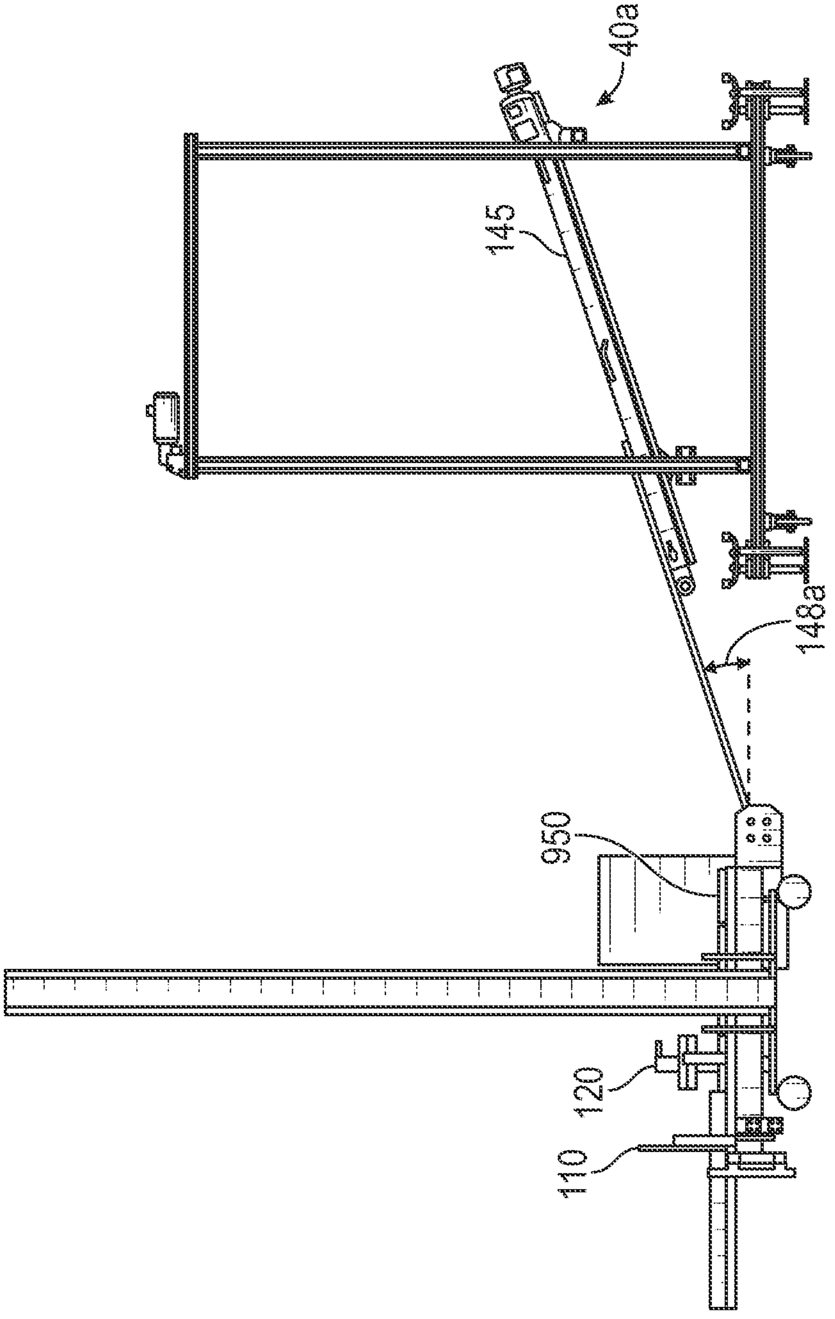
FIGS. 10A-10C show embodiments of the elevator in FIG. 9 in various positions.
Figure 10B:
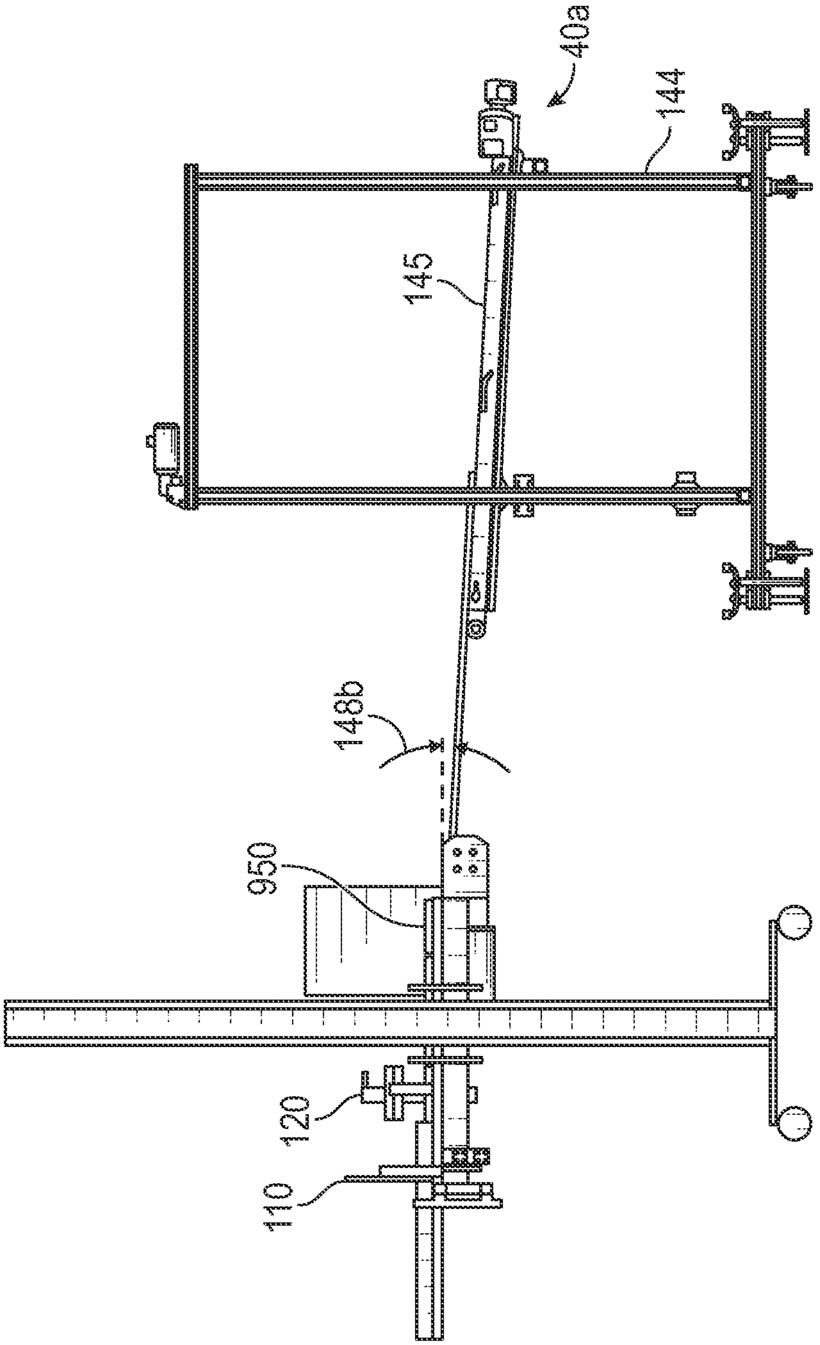
Figure 10C:
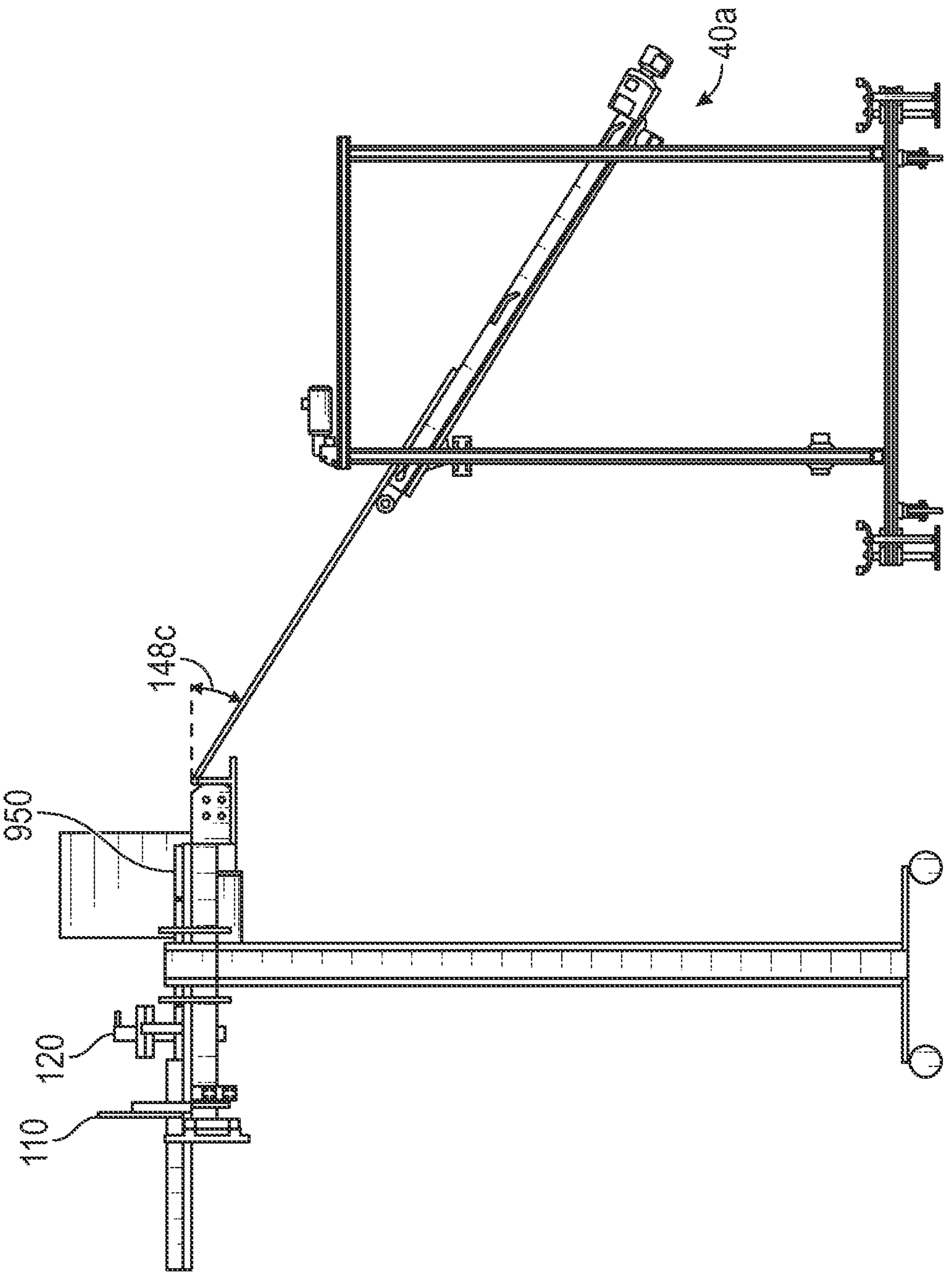

FIGS. 10A-10C show embodiments of the elevator 40*a* in various angled positions 148*a*, 148*b*, and 148*c*. As shown, the elevator 40*a* can be angularly adjustable. This can allow the elevator 40*a* to compensate vertically for various height shelves 16 from the growth environment. In this way, elevator 40*a* can be configured to move a second aerial mycelium panel at a different angle relative to the substantially non-horizontal angle. With reference to FIGS. 9-10C, this functionality can be accomplished by securing the conveyor of elevator 40*a* with pins at both ends to a frame 144 as shown, with one of the pins on one end of the conveyor being movable within slots on the conveyor and the frame. The conveyor is also extendable along its length, to compensate for the change in angles 148*a*, 148*b*, and 148*c*.

Figure 11:
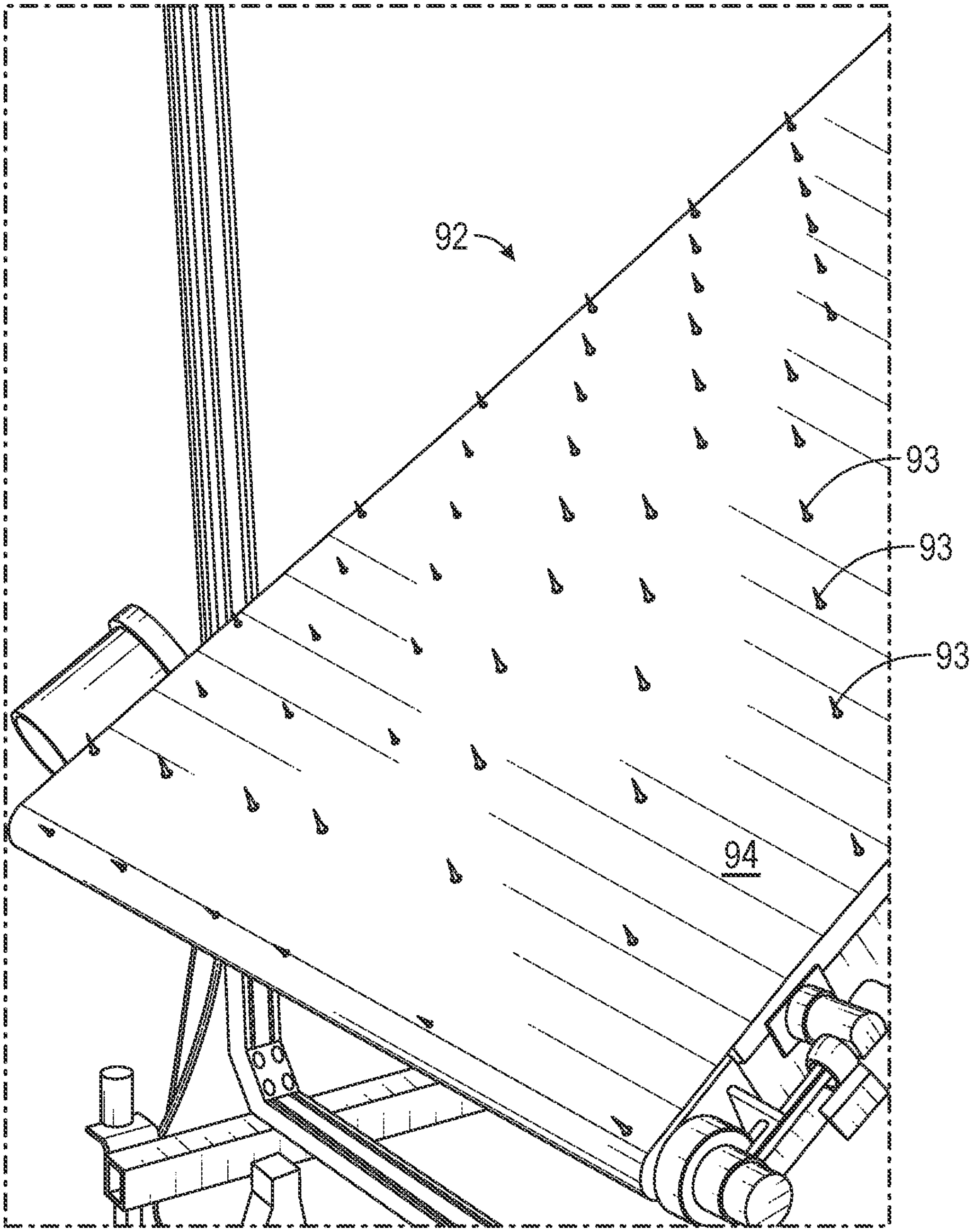
FIG. 11 shows an embodiment of a belt of a conveyor with a plurality of retainers.

FIG. 11 shows an embodiment of a belt 94 of a conveyor 92 that can be implemented within the harvesting systems herein, such as within the elevator 40*a* shown in FIGS. 9-10C. The conveyor 92 includes a plurality of retainers, implemented in this embodiment as a plurality of spikes 93 attached to (e.g., extending through) the belt 94, to retain and prevent slippage of the aerial mycelium panels 950 that are being moved by the elevator 40*a*. Other retainers can be implemented, such as pins, grooves, nubs, and other structures, or by providing a surface with higher friction than a conventional conveyor belt, such as rubber, or a roughened surface. In one embodiment such spikes extend between about ⅛ inch and 2 inches in height so as to allow their penetration into a lower surface of the aerial mycelium panel.

Figure 12:
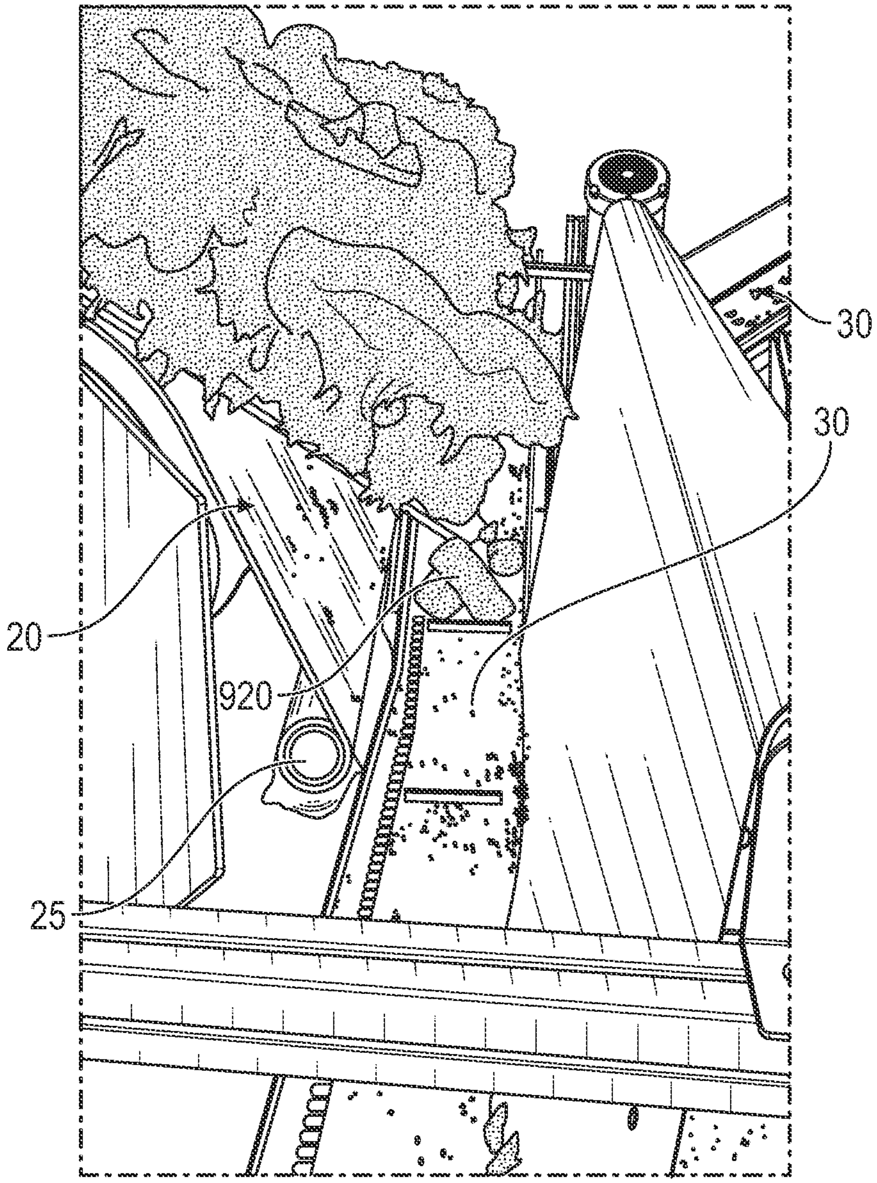
FIG. 12 shows a diverter that can be positioned at the outlet of a net pulling system.

With reference again to FIG. 5, in some embodiments, the system for harvesting mycelium can include one or more diverters implemented at or downstream of a dividing instrument 110. For example, the diverter can be downstream of the cutting instrument or the compression tool 120. The diverter can divert the growth matrix 920 and the aerial mycelium 930 (or aerial mycelium panels 940, 950) relative to each other. For example, the growth matrix 920 can be moved, relative to the aerial mycelium 910 or aerial mycelium panel 950, and/or the aerial mycelium or aerial mycelium panel can be moved relative to the growth matrix 920. An embodiment of a diverter 135 is shown schematically in FIG. 5. The diverter(s) can provide additional functionality, for example, as described with respect to diverting step 235 in FIG. 2. Additional embodiments of a diverter are shown in FIGS. 12-13B and the corresponding text. In some embodiments, the diverter and the dividing instrument can be the same tool, or can otherwise perform the dividing step 230 and diverting step 235 (FIG. 2) at approximately the same time and/or position. In some embodiments, the diverters can be configured to contain the growth matrix 920 and/or the aerial mycelium panels 950. In some embodiments, the diverter can be positioned downstream of the net pulling system outlet. In some embodiments, a diverter can divert the growth matrix 920 away from the net pulling system 20, as the growth matrix 920 breaks apart and falls away from the aerial mycelium panels 950, as described above with respect to FIGS. 3-5. The diverter can include one or more components, such as air knives, vibrating spatulas, food-safe liquid lubricated surfaces, slim nosebar conveyors, channels, conveyors, and/or other suitable components to provide this containment and/or diverter function.

In some embodiments, the diverter can include a chute with an inlet and outlet and enclosed inner volume. The diverters can be movable relative to the net pulling system 20, to allow for better positioning and improved containment and/or diversion of the growth matrix 920. In some embodiments, a reducer, such as a hopper with a pin auger, or other apparatus suitable to break apart and otherwise reduce the average size of the pieces of the growth matrix 920, can be implemented downstream of the net pulling system 20. The reducer can be part of the diverter, or a separate component.

FIG. 12 shows an embodiment of a diverter 35 that can be positioned at the outlet of a net pulling system 20, such as system 20 in FIGS. 3-5. The diverter 35 can comprise a strong, flexible plastic material which forms a vertical channel extending across the width of the outlet of the net pulling system 20. The diverter 35 channels the depleted growth matrix 960 into the outfeed conveyor 30. The diverter 35 can include rotational springs at its ends, similar to an industrial rollup blind, to allow it to extend and retract, to compensate for the vertical adjustment of the net pulling system 20 when pulling webs from varying height shelves 16 from the racks 15 in the growth environment.

Figure 13A:
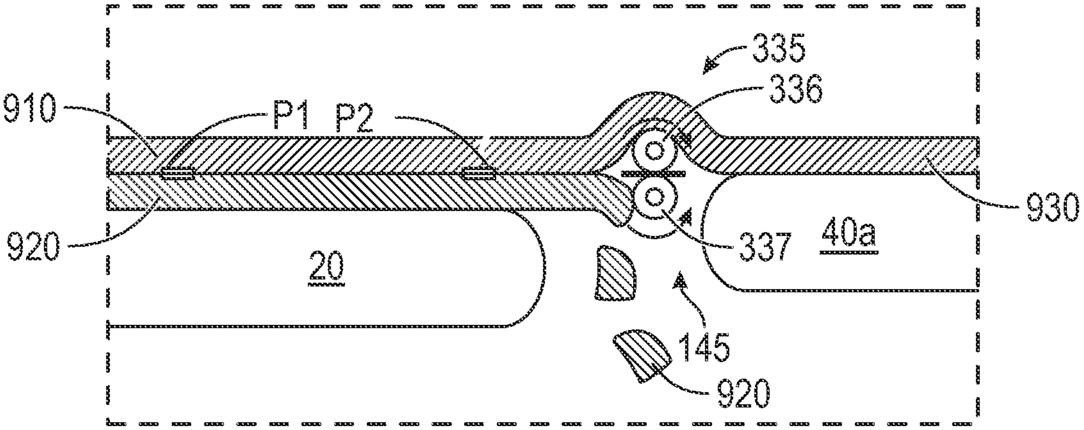
FIGS. 13A and 13B show other embodiments of a diverter that can be positioned at the outlet of a net pulling system.
Figure 13B:
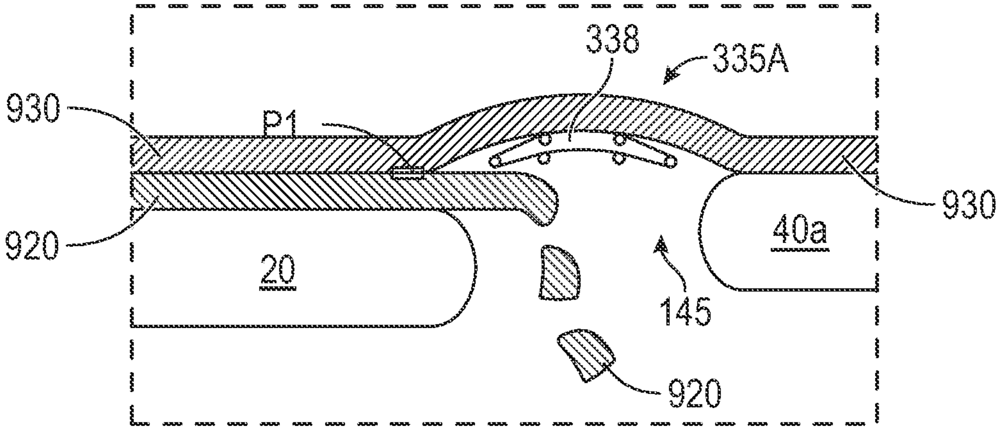

FIG. 13A shows another embodiment of a diverter 335 that can be implemented at an outlet of a net pulling system 20, such as system 20 in FIG. 3-5, or 9. Diverter 335 can comprise opposing rollers 336, 337 (e.g., an upper and lower roller, respectively), positioned approximately along the plane of separation as shown, downstream of one or more cutting instruments (labelled as P1 and P2). The rollers provide the diverting function as describe elsewhere herein, with the upper roller configured to move the aerial mycelium 930 (e.g., through the clockwise rotation shown and/or contact as shown), and the lower roller configured to move the detached growth matrix 920 (e.g., through the counter-clockwise rotation shown and/or contact as shown). The diverter can also allow the aerial mycelium 930 or aerial mycelium panel 950 to span a gap that may exist, for example, between the net pulling system 20 and a downstream movement device, such as the elevator 40*a* as shown.

FIG. 13B shows an embodiment of a diverter 335A that comprises a precision conveyor 338 (e.g., a nose-bar conveyor). The diverter 335A can function similarly as the upper roller of diverter 335 in FIG. 13A. A lower roller, or an additional precision conveyor can be implemented with diverter 335A to provide a similar function as the lower roller of diverter 335 in FIG. 13B. The precision conveyor of diverter 335A may provide additional structural support in moving the aerial mycelium or aerial mycelium panel and spanning the gap.

In some embodiments, a movable system can be implemented, such as a movable trolley 155, which can provide various functionality to a mycelium growth environment and/or harvesting method and system.

A trolley 155 can allow for reduced equipment modification for extensive commercialization. Each manufacturing site can use equipment it has in place (but situated on a trolley) for removing growth matrix 920. A trolley 155 can further separate the food harvest from handling the growth substrate in time and space. It can help mitigate cross contamination of food product with growth substrate. A trolley 155 can be configured to allow for working on shelves 16 in parallel. A trolley 155 can be designed to be a modular frame, so it will have many potential uses. A trolley 155 can reduce the amount of equipment to clean.

Figure 14:
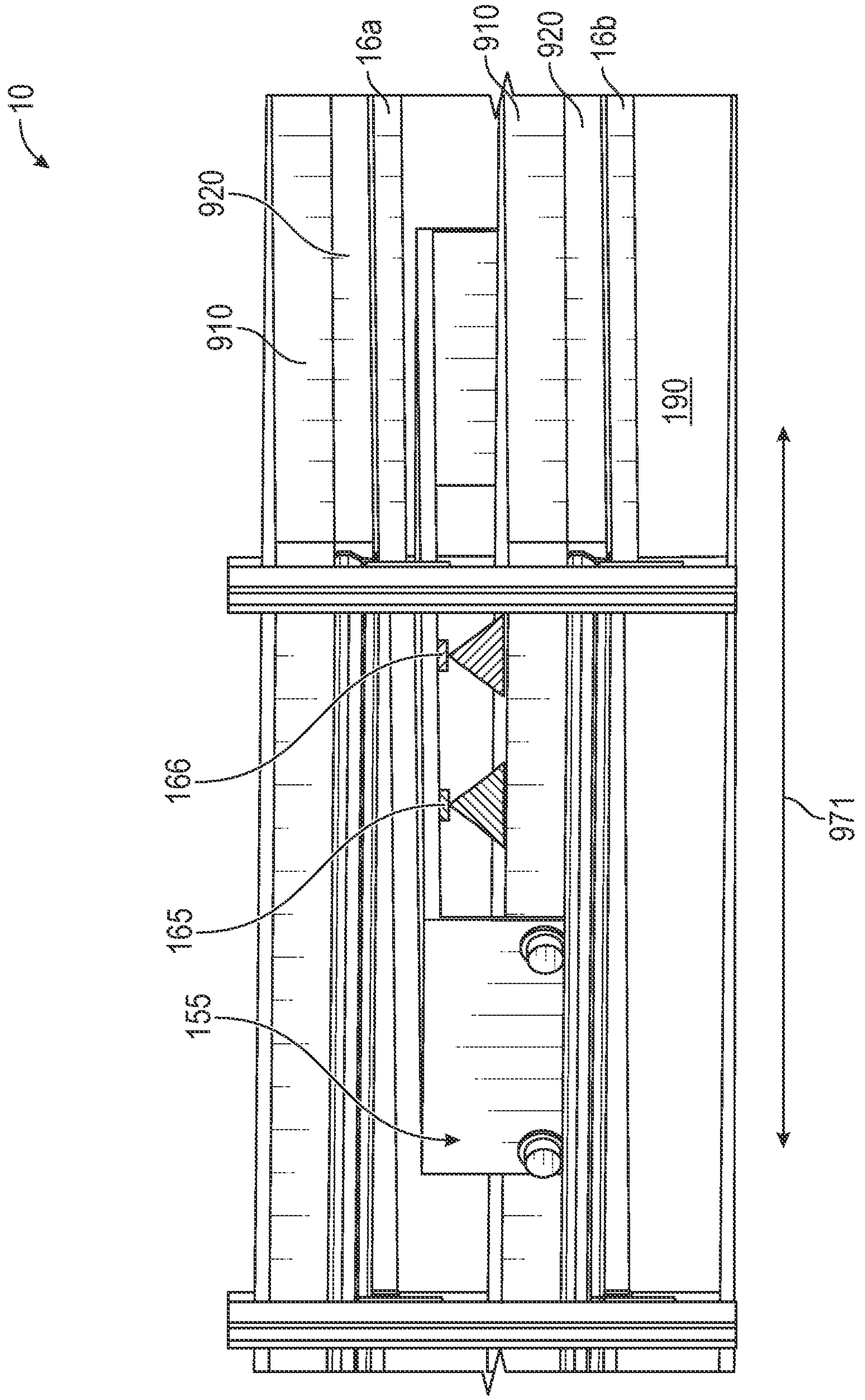
FIG. 14 shows an isometric view of an embodiment of a movable trolley which can provide various functions to a harvesting system.

FIG. 14 shows a schematic view of an embodiment of a movable trolley 155. In this implementation, the trolley 155 can be configured to access (e.g., fit between) two adjacent shelves (e.g., upper shelf 16*a*; lower shelf 16*b*) on a rack 15 within a growth environment 190 (see also, e.g. FIG. 3). The trolley 155 can be configured to move in direction 971, or other directions. The trolley 155 can include one or more modules 165, 166 to provide various functionality.

In some embodiments, the trolley 155 can provide various functionality that can impact the growth processes within the growth environment 190, and additionally, or alternatively monitor the growth processes and progress within the growth environment. For example, the trolley 155 can provide the monitoring 205 and action 215 functionality, with a controller, as shown and described with respect to FIG. 2. In some embodiments, the trolley 155 can provide inspection and quality control functionality of the extra-particle aerial mycelial growth 910 on rack 15, for example, through the use of cameras, sensors (e.g., temperature, heat, humidity), or other growth-monitoring components. In some embodiments, the trolley 155 may include one or more sensors (not shown) to monitor the height of the extra-particle aerial mycelial growth 910. In some embodiments, an image capture device may be disposed at the trolley 155 to provide remote monitoring, for example, to a user, to a processor, etc. These growth monitoring components can provide feedback to a controller (e.g., controller 980 in FIG. 5). In some embodiments, the growth-monitoring component and controller 980 can provide closed loop control to another component of the trolley 155 or other system (such as a component of system 100). For example, the module 165 can comprise an inspection system configured to detect a defect in the extra-particle aerial mycelial growth 910. Upon receiving a signal from the module 165 of such a defect, the controller can send a signal to another component, such as module 166, to address the defect. For example, if the module 165 identifies a deviant morphology, module 166 can take steps to alter localized environmental conditions in the growth environment or spray an appropriate chemical to address the deviant morphology, in response to a signal from the controller. In some embodiments, the module 165 can detect a defect (or deviant morphology) and store a memory of the position of that defect (or deviant morphology), to prevent that portion of a downstream product from being processed into or included in a final product. Such functionality is illustrated for example in FIG. 2.

The trolley 155 can provide various functionality to the harvesting processes within a harvesting system, such as system 100 and others described herein. For example, modules 165 and/or 166 can be configured to divide the web along the separation zone, cut the aerial mycelium, compress the aerial mycelium panel, provide misting functionality, and/or include the diverter(s) and other functions described above. In some embodiments, the trolley 155 can provide this functionality to a web positioned on one of the shelves 16 in the growth environment 190, rather than to a web that is external to and downstream of the growth environment. For example, modules 165 and 166 can be positioned between the shelves 16*a*, 16*b* to process a growth web directly on shelf 16*b*, which may avoid the need for a net pulling system. The trolley 155 can also provide height pre-compression, and/or provide for multiple rack widths (e.g., with minimal changes). The trolley 155 can also provide contamination identification and remediation, and/or provide enhanced entanglement of hyphae for textiles (e.g., with a roller).

In some embodiments, the trolley 155 can be configured to divide the web along the separation zone without indexing. The trolley 155 can include a reciprocating frame. The frame can accommodate a first cutting instrument (e.g., wire saw) as well as a second cutting instrument (e.g., a single axis blade, to provide a "guillotine" cut). The trolley 155 can be configured, for example, with a controller, to adjust the cut height for the single direction cut. In some embodiments, the trolley 155 can be configured to divide the web along the separation zone, and to provide for single axis jog cuts, with indexing.

In some embodiments, the trolley 155 can be configured to divide the web along the separation zone, to provide for single axis jog cuts, to provide for compressing the aerial mycelium panel, with indexing. For example, a compression tool 120 can be implemented to compact the panel after the trolley 155 passes over the divided aerial mycelium. In some embodiments, after dividing the web, the separated aerial mycelium can be moved onto a lower friction support (e.g., comprising high density polyethylene or PTFE) to improve a clean release during the compression step. After the compression step, the panel can be moved to the side to make operator retrieval easier.

The trolley 155 and/or the compression tool can be configured, to be easily removed for cleaning, or to use on other equipment and/or for other purposes. The trolley 155 can be configured to interface with the height restraint of the racks.

Textiles or Other Non-Food Implementations

In some aspects, the present disclosure provides for an aerial mycelium, and for methods of making an aerial mycelium, wherein the aerial mycelium is a growth product of a fungus. In some embodiments, the fungus is a species of the genus *Agrocybe, Albatrellus, Armillaria, Agaricus, Bondarzewia, Cantharellus, Cerioporus, Climacodon, Cordyceps, Fistulina, Flammulina, Fomes, Fomitopsis, Fusarium, Grifola, Hericium, Hydnum, Hypomyces, Hypsizygus, Ischnoderma, Laetiporus, Laricifomes, Lentinula, Lentinus, Lepista, Meripilus, Morchella, Ophiocordyceps, Panellus, Piptoporus, Pleurotus, Polyporus, Pycnoporellus, Rhizopus, Schizophyllum, Stropharia, Tuber, Tyromyces, Wolfiporia, Ceriporiopsis, Chlorociboria, Daedalea, Daedaleopsis, Daldinia, Ganoderma, Hypoxylon, Inonotus, Lenzites, Omphalotus, Oxyporus, Phanerochaete, Phellinus, Polyporellus, Porodaedalea, Pycnoporus, Scytalidium, Stereum, Trametes* or *Xylaria*. In some further embodiments, the fungus is a species of the genus *Bondarzewia, Ceriporiopsis, Daedalea, Daedaleopsis, Fomitopsis, Ganoderma, Inonotus, Lenzites, Omphalotus, Oxyporus, Phellinus, Polyporellus, Polyporus, Porodaedalea, Pycnoporus, Stereum, Trametes* or *Xylaria*. In some more particular embodiments, the fungus is selected from the group consisting of *Bondarzewia berkleyii, Daedalea quercina, Daedaleopsis* spp., *Daedaleopsis confragosa, Daedaleopsis septentrionalis, Fomitopsis* spp., *Fomitopsis cajanderi, Fomitopsis pinicola, Ganoderma* spp., *Ganoderma amboinense, Ganoderma applanatum, Ganoderma atrum, Ganoderma australe, Ganoderma brownii, Ganoderma capense, Ganoderma carnosum, Ganoderma cochlear, Ganoderma colossus, Ganoderma curtisii, Ganoderma donkii, Ganoderma formosanum, Ganoderma gibbosum, Ganoderma hainanense, Ganoderma hoehnelianum Ganoderma japonicum, Ganoderma lingzhi, Ganoderma lobatum, Ganoderma lucidum, Ganoderma multipileum, Ganoderma oregonense, Ganoderma pfeifferi, Ganoderma resinaceum, Ganoderma sessile, Ganoderma sichuanense, Ganoderma sinense, Ganoderma tropicum, Ganoderma tsugae, Ganoderma tuberculosum, Ganoderma weberianum, Inonotus* spp., *Inonotus obliqus, Inonotus hispidus, Inonotus dryadeus, Inonotus tomentosus, Lenzites betulina, Phellinus* spp., *Phellinus ignarius, Phellinus gilvus, Polyporus* spp., *Polyporus squamosus, Polyporus badius, Polyporus umbellatus, Polyporus squamosus, Polyporus tuberaster, Polyporus arcularius, Polyporus albeolaris, Polyporus radicatus, Porodaedalea pini, Pycnoporus* spp., *Pycnoporus* spp., *Pycnoporus sanguineus, Pycnoporus cinnabarinus, Stereum* spp., *Stereum ostea, Stereum hirsutum, Trametes* spp., *Trametes versicolor, Trametes elegans, Trametes suaveolens, Trametes hirsute, Trametes gibbosa, Trametes ochraceae, Trametes villosa, Trametes cubensis* and *Trametes pubescens*. In some other embodiments, the fungus is a pigment-producing fungus of a genus selected from the group consisting of *Chlorociboria, Daldinia, Hypoxylon, Phanerochaete* and *Scytalidium*. In yet some other embodiments, the fungus is a species of the genus *Ganoderma*. In some further embodiments, the fungus is *Ganoderma* spp., *Ganoderma amboinense, Ganoderma applanatum, Ganoderma atrum, Ganoderma australe, Ganoderma brownii, Ganoderma capense, Ganoderma carnosum, Ganoderma cochlear, Ganoderma colossus, Ganoderma curtisii, Ganoderma donkii, Ganoderma formosanum, Ganoderma gibbosum, Ganoderma hainanense, Ganoderma hoehnelianum Ganoderma japonicum, Ganoderma lingzhi, Ganoderma lobatum, Ganoderma lucidum, Ganoderma multipileum, Ganoderma oregonense, Ganoderma pfeifferi, Ganoderma resinaceum, Ganoderma sessile, Ganoderma sichuanense, Ganoderma sinense, Ganoderma tropicum, Ganoderma tsugae, Ganoderma tuberculosum or Ganoderma weberianum.*

Food Implementations

In some aspects, the present disclosure provides for an aerial mycelium, and for methods of making an aerial mycelium, wherein the aerial mycelium is a growth product of a fungus. In some embodiments, the fungus is a species of the genus *Agrocybe, Albatrellus, Armillaria, Agaricus, Bondarzewia, Cantharellus, Cerioporus, Climacodon, Cordyceps, Fistulina, Flammulina, Fomes, Fomitopsis, Fusarium, Grifola, Hericium, Hydnum, Hypomyces, Hypsizygus, Ischnoderma, Laetiporus, Laricifomes, Lentinula, Lentinus, Lepista, Meripilus, Morchella, Ophiocordyceps, Panellus, Piptoporus, Pleurotus, Polyporus, Pycnoporellus, Rhizopus, Schizophyllum, Stropharia, Tuber, Tyromyces* or *Wolfiporia*. In some further embodiments, the fungus is a species of the genus *Pleurotus*. In some more particular embodiments, the fungus is *Pleurotus albidus, Pleurotus citrinopilleatus, Pleurotus columbinus, Pleurotus cornucopiae, Pleurotus dryinus, Pleurotus djamor, Pleurotus eryngii, Pleurotus floridanus, Pleurotus nebrodensis, Pleurotus ostreatus, Pleurotus populinus, Pleurotus pulmonarius, Pleurotus sajor-caju, Pleurotus salmoneo-stramineus, Pleurotus salmonicolor* or *Pleurotus* tuber-regium.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general-purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a tangible, non-transitory computer-readable medium. Computer-readable media includes both computer storage media and communication media including any medium that can be enabled to transfer a computer program from one place to another. A storage media may be any available media that may be accessed by a computer.

A software module may reside in random access memory (RAM), flash memory, read only memory (ROM), electrically programmable ROM (EPROM), electrically erasable programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein. Additionally, a person having ordinary skill in the art will readily appreciate that the terms "upper" and "lower" are sometimes used for ease of describing the figures and indicate relative positions corresponding to the orientation of the figure on a properly oriented page and may not reflect the proper orientation of a feature as implemented.

While certain embodiments of the inventions have been described, these embodiments have been presented by way of example only and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

The word "exemplary" is used herein to mean "serving as an example, instance, or illustration." Any aspect or embodiment described herein as "exemplary" is not necessarily to be construed as preferred or advantageous over other aspects or embodiments. Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect described. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosures set forth herein. It should be understood that any aspect disclosed herein may be embodied by one or more elements of a claim.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Although features may be described above as acting in certain combinations, one or more features from a claimed combination can, in some cases, be excised from the combination, and the combination may be claimed as a subcombination or variation of a subcombination.

The features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z. Thus, as used herein, a phrase referring to "at least one of X, Y, and Z" is intended to cover: X, Y, Z, X and Y, X and Z, Y and Z, and X, Y and Z.

The headings provided herein, if any, are for convenience only and do not necessarily affect the scope or meaning of the devices and methods disclosed herein.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and within less than 0.01% of the stated amount.

The scope of the present disclosure is not intended to be limited by the specific disclosures of embodiments in this section or elsewhere in this specification and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A method of harvesting an aerial mycelium panel, comprising:

providing a mycological growth web comprising a growth matrix, an extra-particle aerial mycelial growth, and a growing net;

moving the web in a longitudinal direction;

dividing the web along a separation zone to detach the extra-particle aerial mycelial growth from the growth matrix and form an aerial mycelium;

cutting the aerial mycelium in a transverse direction and across a width of the aerial mycelium to form an aerial mycelium panel, wherein the cutting and the dividing are performed by the same cutting instrument; and compressing at least a portion of the aerial mycelium panel along at least one of the width of the panel and in the transverse direction.

2. The method of claim 1, wherein a perforated sheet is positioned along the separation zone, and dividing the web comprises peeling the growth matrix and the sheet from the extra-particle aerial mycelial growth.

3. The method of claim 1, wherein the separation zone comprises a plane of separation, and dividing the web comprises cutting the web along the plane of separation.

4. The method of claim 1, wherein the cutting instrument is a wire saw.

5. The method of claim 1, further comprising stopping the web during at least one of cutting the aerial mycelium and compressing at least a portion of the aerial mycelium panel.

6. The method of claim 1, wherein compressing comprises compressing substantially the entirety of the panel in the transverse direction.

7. The method of claim 1, further comprising misting the aerial mycelium or the aerial mycelium panel prior to the compressing.

8. The method of claim 1, further comprising diverting the growth matrix and the aerial mycelium or aerial mycelium panel relative to each other.

9. The method of claim 8, wherein the growth matrix comprises a plurality of pieces after the diverting step, further comprising reducing at least some of the plurality of pieces in size.

10. The method of claim 1, further comprising moving the aerial mycelium panel from a first elevation to a second elevation.

11. The method of claim 10, wherein moving the aerial mycelium panel comprises moving the aerial mycelium panel at a substantially non-horizontal angle.

12. A method of forming a first and a second aerial mycelium panel using the method of claim 10, wherein moving comprises moving the first aerial mycelium panel at a first angle and moving the second aerial mycelium panel at a second angle, wherein the first angle and the second angle are different relative to each other.

13. The method of claim 1, wherein said method comprises using a trolley apparatus to implement at least one of said method steps.

14. The method of claim 1, wherein said method comprises a monitoring step for identifying deviant morphology in said web and preventing its inclusion in a final product made from said web.

15. The method of claim 14 wherein said monitoring step is carried out by a monitoring device mounted on either a movable or portable trolley apparatus.

16. A system for harvesting an aerial mycelium, comprising:

- a net pulling system configured to longitudinally move a mycological growth web;
- a dividing instrument configured to divide the web along a separation zone to detach the extra-particle aerial mycelial growth from the growth matrix and form an aerial mycelium;
- a cutting instrument configured to move in a transverse direction and cut across a width of the aerial mycelium to form an aerial mycelium panel, wherein the cutting instrument comprises a wire saw; and
- a compression tool configured to compress at least a portion of the aerial mycelium panel along at least one of the width of the panel and in the transverse direction.

17. The system of claim 16, wherein the wire saw is configured to oscillate along the width of the aerial mycelium.

18. The system of claim 16, wherein the dividing instrument comprises the wire saw, wherein the separation zone comprises a plane of separation, and further comprising a controller configured to move the wire saw to a position to allow the web to be cut along the plane of separation while the net pulling system longitudinally moves the mycological growth web.

19. The system of claim 18, wherein the controller is further configured to stop the net pulling system to allow the wire saw to cut across the width of the aerial mycelium and form the aerial mycelium panel.

20. The system of claim 16, wherein the compression tool is configured to compress substantially the entirety of the panel in the transverse direction.

21. The system of claim 16, further comprising one or more sprayers configured to spray the aerial mycelium or the aerial mycelium panel.

22. The system of claim 16, further comprising an elevator configured to move the aerial mycelium panel from a first elevation to a second elevation.

23. The system of claim 22, wherein the elevator is configured to move the aerial mycelium panel at a substantially non-horizontal angle.

24. The system of claim 23, wherein the elevator is angularly adjustable and configured to move a second aerial mycelium panel at a different angle relative to the substantially non-horizontal angle.

25. The system of claim 16, further comprising a diverter positioned at or downstream of the dividing instrument, wherein the diverter is configured to divert the growth matrix and the aerial mycelium or aerial mycelium panel relative to each other.

26. The system of claim 25, wherein the growth matrix comprises a plurality of pieces, further comprising a reducer configured to reduce at least some of the plurality of pieces in size.

27. A method of harvesting an aerial mycelium panel, comprising:

- providing a mycological growth web comprising a growth matrix, an extra-particle aerial mycelial growth, and a growing net;
- monitoring said mycological growth web by at least one monitoring device, in order to detect and record a deviant morphology in said mycological growth web;
- communicating a position of said deviant morphology in said mycological growth web to a downstream method step function;
- moving the web in a longitudinal direction;
- dividing the web along a separation zone to detach the extra-particle aerial mycelial growth from the growth matrix and form an aerial mycelium;
- cutting the aerial mycelium in a transverse direction and across a width of the aerial mycelium to form an aerial mycelium panel, whereby said cutting step avoids inclusion of deviant morphology in said web which position had been communicated from said monitoring device; and
- compressing at least a portion of the aerial mycelium panel along at least one of the width of the panel and in the transverse direction.

28. A method of harvesting an aerial mycelium panel, comprising:

- providing a mycological growth web comprising a growth matrix, an extra-particle aerial mycelial growth, and a growing net and a perforated sheet along a separation zone;
- moving the web in a longitudinal direction; and
- dividing the web along the separation zone to detach the extra-particle aerial mycelial growth from the growth matrix and the perforated sheet and form an aerial mycelium.

29. The method of claim 28 further comprising:

- cutting the aerial mycelium in a transverse direction and across a width of the aerial mycelium to form an aerial mycelium panel; and
- compressing at least a portion of the aerial mycelium panel along at least one of the width of the panel and in the transverse direction.

* * * * *